(12) United States Patent
Fong et al.

(10) Patent No.: US 7,005,247 B1
(45) Date of Patent: Feb. 28, 2006

(54) CONTROLLED SELECTIVITY ETCH FOR USE WITH OPTICAL COMPONENT FABRICATION

(75) Inventors: Joan Fong, San Marino, CA (US); Wei Qian, Torrance, CA (US); Dawei Zheng, San Gabriel, CA (US); Zhian Shao, Torrance, CA (US); Lih-Jou Chung, Anaheim, CA (US); Xiaoming Yin, Irvine, CA (US)

(73) Assignee: Kotusa, Inc., Monterey Park, CA (US)

( * ) Notice: Subject to any disclaimer, the term of this patent is extended or adjusted under 35 U.S.C. 154(b) by 353 days.

(21) Appl. No.: 10/345,709

(22) Filed: Jan. 15, 2003

Related U.S. Application Data

(63) Continuation-in-part of application No. 10/236,505, filed on Sep. 6, 2002.

(51) Int. Cl.
*G03F 7/26* (2006.01)

(52) U.S. Cl. ................ 430/321; 430/323; 216/24; 216/72

(58) Field of Classification Search .............. 216/24, 216/72; 430/322, 323, 321; 438/29, 31
See application file for complete search history.

(56) References Cited

U.S. PATENT DOCUMENTS

| | | | |
|---|---|---|---|
| 3,563,630 A | 2/1971 | Anderson et al. | |
| 3,753,803 A | 8/1973 | Nomura et al. | |
| 4,652,290 A | 3/1987 | Cho et al. | |
| 4,776,661 A | 10/1988 | Handa | |
| 4,895,615 A | 1/1990 | Muschke | |
| 4,904,617 A | 2/1990 | Muschke | |
| 5,078,516 A | 1/1992 | Kapon et al. | |
| 5,142,596 A | 8/1992 | Mizuuchi | |
| 5,182,787 A | 1/1993 | Blonder et al. | |
| 5,278,926 A | 1/1994 | Doussiere | |
| 5,323,476 A | 6/1994 | Mueller et al. | |
| 5,333,216 A | 7/1994 | Sakata et al. | |
| 5,498,312 A | 3/1996 | Laermer et al. | |
| 5,501,893 A | 3/1996 | Laermer et al. | |
| 5,517,589 A | 5/1996 | Takeuchi | |
| 5,580,800 A | 12/1996 | Zhang et al. | |
| 5,710,847 A | 1/1998 | Takano et al. | |
| 5,786,925 A | 7/1998 | Goossen et al. | |
| 5,814,239 A | 9/1998 | Kaneko et al. | |
| 5,830,786 A | 11/1998 | Zhang et al. | |
| 5,838,870 A | 11/1998 | Soref | |
| 5,841,931 A | 11/1998 | Foresi et al. | |
| 5,843,848 A | 12/1998 | Yanagawa | |
| 5,853,960 A | 12/1998 | Tran et al. | |
| 5,874,362 A | 2/1999 | Wong et al. | |
| 5,910,012 A | 6/1999 | Takeuchi | |
| 6,051,503 A | 4/2000 | Bhardwaj et al. | |
| 6,108,478 A | 8/2000 | Harpin et al. | |
| 6,110,290 A | 8/2000 | Maeda | |
| 6,127,277 A | 10/2000 | DeOmellas | |
| 6,127,278 A | 10/2000 | Wang et al. | |
| 6,187,685 B1 | 2/2001 | Hopkins et al. | |
| 6,235,214 B1 | 5/2001 | Deshmukh et al. | |
| 6,284,148 B1 | 9/2001 | Laermer et al. | |
| 6,287,941 B1 | 9/2001 | Kang et al. | |
| 6,324,204 B1 | 11/2001 | Deacon | |
| 6,351,329 B1 | 2/2002 | Greywall | |
| 2001/0001652 A1 | 5/2001 | Kanno et al. | |
| 2001/0001729 A1 * | 5/2001 | Leverd et al. | ............ 438/689 |
| 2003/0044118 A1 * | 3/2003 | Zhou et al. | ............ 385/43 |
| 2004/0125346 A1 * | 7/2004 | Huibers | ............ 353/98 |

FOREIGN PATENT DOCUMENTS

| | | |
|---|---|---|
| EP | 0527604 A2 | 2/1993 |
| EP | 0989430 A2 | 3/2000 |
| GB | 2318211 | 4/1998 |
| JP | 5-134124 | 5/1993 |

OTHER PUBLICATIONS

Ahmad, R. U. et al., *Ultracompact Corner-Mirrors and T-Branches in Silicon-On-Insulator*, IEEE Photonics Technology Letters, vol. 14, No. 1, Jan. 2002, pp. 65-67.

Benson, T.M., *Etched-Wall Bent-Guide Structure for Integrated Optics in the III-V Semiconductors*; Journal of Lightwave Technology, vol. LT-2, No. 1, Feb. 1984; p. 31-34.

Betty, I. et al., *A Robust, Low-Crosstalk, InGaAsP/InP Total-Internal-Reflection Switch For Optical Cross-Connect Application*.

Brenner, T. et al., *Vertical InP/InGaAsP Tapers for Low-Loss Optical Fibre-Waveguide Coupling*, Electronics Letters 22$^{nd}$ Oct. 1992 vol. 28 No. 22, pp. 2040-2041.

Cai, Y. et al., *A Novel Three-Guide Optical Coupler Using A Taper-Formed Waveguide*; j. Appl. Phys 69(5), Mar. 1991; p. 2810-2814.

Cavailles, J.A. et al., *First Digital Optical Switch Based on InP/GaInAsP Double Heterostructure Waveguides*; Electronics Letters, vol. 27, No. 9, Apr. 25, 1991, p. 699-700.

Chollet, F. et al., *Compact Evanescent Optical Switch and Attenuator with Electromechanical Actuation*, IEEE Journal of Selected topics in Quantum Electronics, vol. 5 No. 1, Jan./Feb. 1999, pp. 52-59.

(Continued)

*Primary Examiner*—Kathleen Duda
(74) *Attorney, Agent, or Firm*—Gavrilovich, Dodd & Lindsey, LLP

(57) ABSTRACT

A method of fabricating an optical component includes forming a mask on an optical component precursor. The method also includes etching through at least a portion of the mask so as to etch an underlying medium concurrently with remaining mask and transfer a feature of an upper surface of the mask onto an upper surface of the underlying medium. The etch can be configured such that a ratio of the underlying medium etch rate to the mask etch rate is less than about 1.5:1. In some instances, the underlying medium is silicon and the mask is a photoresist.

32 Claims, 17 Drawing Sheets

OTHER PUBLICATIONS

Clemens, et al., *Wavelength-Adaptable Optical Phased Array in $SiO_2$-Si*, Photonics Technology Letters, Oct. 1995, vol. 7-No 10, 1040-1041.

Deri, R.J., et al., *Low-Loss Multiple Quantum Well GaInAs/InP Optical Waveguides*; Feb. 21, 1989.

Dumbravescu, N., *3-D Resolution Gray-Tone Lithography*, Proceedings of SPIE vol. 4019 (2000) pp. 570-577.

Eng, T., et al., *Surface-Micromachined Epitaxial Silicon Cantilevers as Movable Optical Waveguides on Silicon-On-Insulator Substrates*, Sensors and Actuators, A 49 (1995) 109-113.

Erman, M. et al., *III-V Semiconductor Waveguides and Phase-Modulators: The Localized Vapor Phase Epitaxy Approach*, SPIE vol. 651 Integrated Optical Circuit Engineering III (1986) pp. 75-82.

Faustini et al., *Loss Analysis and Interference Effect in Semiconductor Integrated Waveguide Turning Mirror*, IEEE Photonics Technology Letters, vol. 8, No. 10, Oct. 1996, pp. 1355-1357.

Fischer, et al., *Singlemode Optical Switches Based on SOI Waveguides with Large Cross-Section*, Electronics Letters, Mar. 3, 1994, vol. 30-No. 5, pp. 406-408.

Fischer, K. et al, *Sensor Application of SiON Integrated Optical Waveguides On Silicon*; Elevier Sequoia, 1992; p. 209-213.

Fischer, U. et al., *0.1 dB/cm Waveguide Losses in Single-Mode SOI Rib Waveguides*, IEEE Photonics Technology Letters, vol. 8, No. 5, May 1996, pp. 647-648.

Fish, G. et al., *Monolithic InP Optical Crossconnects: 4×4 and Beyond*, JWB2-1, p. 19-21.

Ghirardi, F. et al., *Quais Planar Spot-size Transformer for Efficent Couping Between a Cleaved Fibre and an InP/InGaAsP Rib Waveguide*, IEEE Photinics TEchnology Letters, vol. 6, No. 4, Apr. 1994, pp 522-524.

Goodwill, D. et al., *Laser-Array to Single-Mode-Fiber Coupling Module with Increased Tolerance Budget Using Polymer Waveguide Tapers*; SPIE vol. 2844; p. 60-70.

Huang, T.C. et al., *Depletion Edge Translation Waveguide Crossing Optical Switch*; IEEE Photonics Technology Letters; vol. 1, No. 7, Jul. 1989, p. 168-170.

Inoue, H. et al, *Low Loss GaAs Optical Waveguides*, Journal of Lightwave Technology, vol. LT-3, No. 6, Dec. 1985; p. 204-209.

Irace, A. et al., *Fast Silicon-on-Silicon Optoelectronic Router Based on a BMFET Device*, Journal of Selected Topics in Quantum Electronics, Jan./Feb. 2000, vol. 6-No. 1, pp. 14-18.

Jeon, S. et al., *Simple Fabrication Method for Vertical Taper Using Tensile Stress-Induced Mask and Selective Etching Technique*, CLEO Pacific Rim '99 WR&, pp. 320-321.

Johnston, I.R., et al., *Silicon-Based Fabrication Process For Production Of Optical Waveguides*; IEE Proc-Optoelectron., vol. 143, No. 1, Feb. 1996, p. 37-40.

Khan, M.N. et al., *Fabrication-Tolerant, Low-Loss, and High-Speed Digital Optical Switches in InGaAsP/InP Quantum Wells*; Proc 21st Eur.Conf.on Opt.Comm.(ECOC '95-Brussels), p. 103-106.

Khan, M.N. et al., *High-Speed Operation of Quantum Well Electron Transfer Digital Optical Switches*; p. 102-102c.

Kirihara, T. et al., *Lossless And Low Crosstalk 4×4 Optical Switch Array; Electronics And Communications In Japan*, Part 2, vol. 77, No. 11, 1994, p. 73-81.

Koch, T. et al., *Tapered Waveguide InGaAs/inGaAsP Multiple-Quantum-Well Lasers*, IEEE Photonics TEchnology Letters, vol. 2, No. 2, Feb. 1990, pp. 88-90.

Liu, Y.L. et al., *Silicon 1×2 Digital Optical Switch Using Plasma Dispersion*; Electronics Letters, vol. 30, No. 2, Jan. 20, 1994; p. 130-131.

Mak, G. et al., *High-Speed Bulk InGaAsP-InP Electroabsorption Modulators with Bandwidth in Excess of 20 GHz*, IEEE Photonics Technology Letter, vol. 2, No. 10, Oct. 1990, p. 730-733.

Mersali, B. et al., *Theoretical and Experimental Studies of a Spot-Size Transformer with Integrated Waveguide for Polarization Insensitive Optical Amplifiers*, Journal of Lightwave Technology, vol. 13, No. 9, Sep. 1995, pp. 1865-1872.

Mersali, B. et al., *Optical-Mode Transformer: A III-V Circuit Integration Enabler*, IEEE Journal of Selected Topics in Quantum Electronics, vol. 3, No. 6, Dec. 1997, pp. 1321-1331.

Moerman, I. et al., *A Review on Fabrication Technologies for the Monolithic Integration of Tapers with III-V Semiconductor Devices*; IEEE Journal of Selected Topics in Quantum electronics, vol. 3, No. 6, Dec. 1997, p. 1308-1320.

Müller, G. et al., *First Low Loss InP/InGaAsP Optical Switch with Integrated Mode Transformers*; ThC12.10; p. 37-40.

Nelson, W.H. et al., *Wavelength-and Polarization-Independent Large Angle InP/InGaAsP Digital Optical Switches with Extinction Ratios Exceeding 20 dB*; IEEE Photonics Technology Letters, vol. 6, No. 11, Nov. 1994; p. 1332-1334.

Noda, Y. et al., *High-Speed Electroabsorption Modulator with Strip-Loaded GaInAsP Planar Waveguide*; Journal of Lightwave Technology, vol. LT-4, No. 10, Oct. 1986, p. 1445-1453.

Otomo, A. et al., *Adiabatic Focusing Structures in Low Loss Dans Polymer Waveguide*, Electronics Letters Jan. 7, 1993, vol. 29, No. 1.

Pohl, A. et al., *Symmetrical Field-Matching Waveguide for Low-loss Fiber-chip Butt Coupling*, J. Opt. Commun. 16 (1995) 4, 138-142.

Reimer, K. et al., *Micro-Optic Fabrication Using One-Level Gray Tone Lithography*, SPIE vol. 3008, pp 279-288.

Reimer, K. et al., *One-Level Gray-Tone Lithography Mask Data Preparation and Pattern Transfer*, SPIE vol. 2783, pp. 71-79.

Renaud, M. et al., *Compact Digital Optical Switches for Low Insertion Loss Large Switch Arrays on InP*; Proc. 21st Eur. Conf.on Opt. Comm. (ECOC '95-Brussels), p. 99-102.

Schauwecker, B. et al, *Small-Size Silicon-Oxynitride AWG Demultiplexer Operating Around 725 nm*, IEEE Photonics Technology Letters, vol. 12 No. 12, Dec. 2000.

Sneh, A. et al., *Compact Low Crosstalk and Low Propagation Loss Quantum-Well Y-Branch Switches*; PDP 4-1-4-5.

Stoll, L. et al., *1:8 Optical Matrix Switch on InP/InGaAsP with Integrated Mode Transformers*; Optical Switches and Modulators II, p. 531-534.

Studenkov, P. V., et al., *Efficient Coupling in Integrated Twin-Waveguide Lasers Using Waveguide Tapers*, IEEE Photonics Technology Letters, vol. 11, No. 9, Sep. 1999; p. 1096-1098.

Stutius, W. et al, *Silicon Nitride Films On Silicon For Optical Waveguides*, Applied Optics, vol. 16, No. 12, Dec. 1977, p. 303-307.

Sugie, T. et al., *1.3-μm Laser Diodes with a Butt-jointed Selectively Grown Spot-Size Converter*, ThB2-6, IOOC95, p. 52-53.

Sugita, A. et al., *Very Low insertion Loss Arrayed-Waveguide Grating with Vertically Tapered Waveguides*, IEEE Photonics Technology Letters, vol. 12, No. 9, Sep. 2000; p. 1180-1182.

Tohmori, Y. et al., *Spot-Size Converted 1.3 um Laser with Butt-Jointed Selectively Grown Vertically Tapered Waveguide*, Electronics Letters Jun. 22, 1995 vol. 31, No. 13, pp. 1069-1070.

Treyz, G.V. et al., *Silicon Optical Modulators at 1.3μm Based on Free-Carrier Absorption*, IEEE Electron Device Letters, vol. 12, No. 6, Jun. 1991; p. 276-278.

Vinchant, J.F. et al., *First Polarisation insensitive 4×4 Switch matrix on InP with Digital Optical Switches*, TuB7.3, p. 341-344.

Vinchant, J.F. et al., *InP Digital Optical Switch: Key Element for Guided- Wave Photonic Switching*; IEE Proceedings-J, vol. 140, No. 5, Oct. 1993; p. 301-307.

Vinchant, J.F. et al., *Low Driving Voltage or Current Digital Optical Switch on InP for Multiwavelength System Applications*; Electronics Letters, vol. 28, No. 12, Jun. 4, 1992; p. 1135-1137.

Yamaguchi, N. et al., *Low-Loss Spot Size Transformer by Dual Tapered Waveguide (DTW-SST)*, Journal of Lightwave Technology, vol. 8, No. 4, Apr. 1990, pp. 587-594.

Yoshimoto, et al., *Spot Size Converters Using InP/InAIAs Multiquantum Well Waveguides for Low Loss Singlemode Fibre Coupling*, Electronics Letters, Aug. 1992, pp. 1610-1611.

Zengerle, R. et al., *Tapered Twin Waveguides For Spot-Size Transformation In InP*; TheB2-5; IOOC 95; p. 50-51.

Zengerle, R. et al., *Low-Loss Fibre-Chip Coupling by Buried Laterally Tapered InP/InGaAsP Waveguide Structure*, Electronics Letters Mar. 26, 1992, vol. 18, No. 7, pp. 631-633.

\* cited by examiner

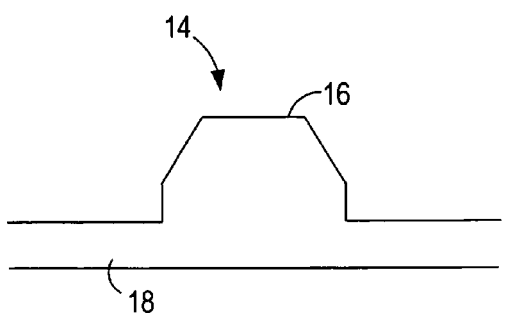
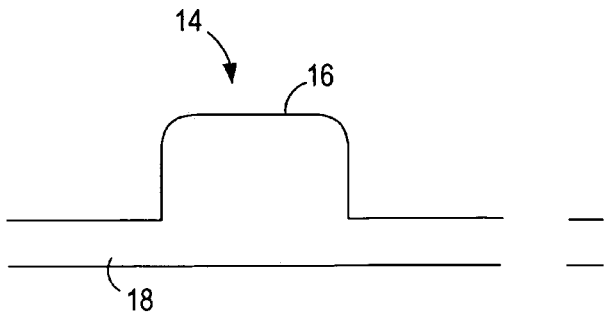
Figure 1E Figure 1F
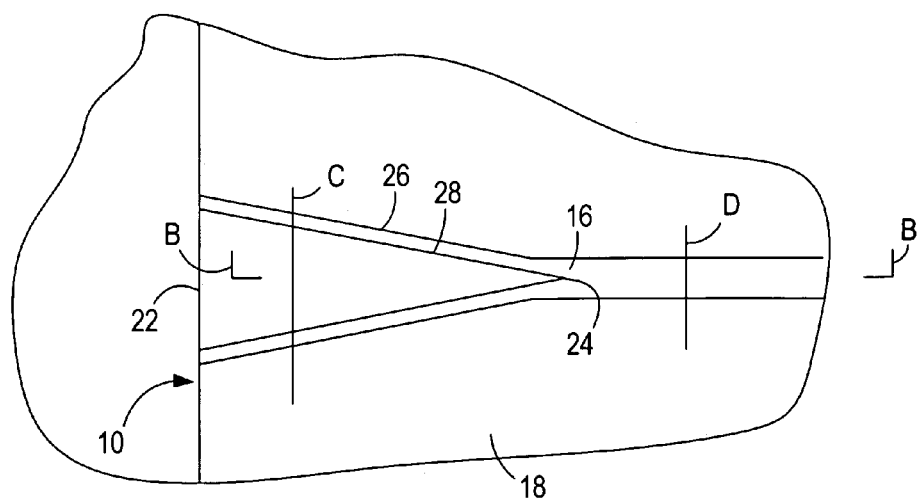
Figure 2A

Figure 6F   Figure 6G

CONTROLLED SELECTIVITY ETCH FOR USE WITH OPTICAL COMPONENT FABRICATION

RELATED APPLICATIONS

This application is related to U.S. patent application Ser. No. 09/845,093, filed on Apr. 27, 2001, entitled "Formation of an Optical Component" and incorporated herein in its entirety, now abandoned. This application is also related to U.S. patent application Ser. No. 10/072,811, filed on Feb. 8, 2002, entitled "Formation of an Optical Component Having Smooth Sidewalls" and incorporated herein in its entirety, now abandoned.

This application is a continuation-in-part of U.S. patent application Ser. No. 10/236,505, filed on Sep. 6, 2002, entitled "Optical Component Having Waveguides Extending from a Common Region" and incorporated herein in its entirety, allowed.

BACKGROUND

1. Field of the Invention

The invention relates to fabrication of optical components. In particular, the invention relates to etches having controlled selectivity and related optical component applications.

2. Background of the Invention

Two-dimensional optical devices typically include one or more optical components formed on a wafer having a light transmitting medium positioned on a base. These optical components are often fabricated by etching the light transmitting medium while employing a mask to protect one or more regions of the light transmitting medium from the etchant. In order for the mask to protect the optical component through the duration of the etch, these etches are selected to etch the light transmitting medium at a higher rate than the mask. Because the mask remains intact during these etches, the etches are limited to forming vertical surfaces of the optical component. Accordingly, these etches are not suitable for forming complex features such as vertical tapers on an optical component. There is a need for optical component fabrication methods that allow for formation of complex optical component features.

SUMMARY OF THE INVENTION

The invention relates to a method of fabricating an optical component. The method includes forming a mask on an optical component precursor. The method also includes etching through at least a portion of the mask so as to etch an underlying medium concurrently with remaining mask and transfer a feature of an upper surface of the mask onto an upper surface of the underlying medium.

In some instances, the upper surface of the mask includes a vertical taper that is substantially transferred to the underlying medium. For instance, the mask can include a vertical taper that is substantially transferred to a mode transformer so as to provide a vertically tapered mode transformer.

In some instances, the upper surface of the mask is smoother than the upper surface of the underlying medium. The etch can substantially transfer the upper surface of the mask to the upper surface of the underlying medium and can accordingly smooth the upper surface of the underlying medium.

Another embodiment of the method includes forming a mask on an optical component precursor. The method also includes etching through at least a portion of the mask so as to etch an underlying medium concurrently with remaining mask. The ratio of the medium etch rate to the mask etch rate can be less than 1.5:1 during the etch. In some instances, the ratio is between 0.9:1 and 1.1:1.

Another embodiment of the method includes forming a photoresist over silicon on an optical component precursor. The method also includes etching the optical component precursor such that the silicon and the photoresist are concurrently etched with an etchant including a Fluorine containing gas and one or more second components having the general formula $C_xH_yF_z$ where X=1 or greater, Y=0 or greater, and Z=1 or greater.

The Fluorine containing gas can be $SF_6$ and/or the one or more second components are selected from the group consisting of $CF_4$, $CHF_3$, $CH_2F_2$, $C_2F_6$, $C_4F_6$, and $C_4F_8$. In some instances, the etchant is applied to the optical component precursor at an RF DC bias power of about 100 W to 140 W and/or at a pressure in a range of 1–10 mTorr.

BRIEF DESCRIPTION OF THE FIGURES

FIG. 1E is a cross section of an optical component having a mode transformer that tapers along a lateral axis.

FIG. 1F is a cross section of an optical component having a mode transformer that tapers along a lateral axis. The taper is not linear and provides for a mode transformer having a curved vertical side.

FIG. 2A is a topview of a portion of an optical component having a mode transformer with an upper region and a lower region.

DETAILED DESCRIPTION

The method relates to an etch having a particular selectivity for use in the fabrication of optical components. For instance, the etch can be configured to etch a mask on an optical component and the underlying medium such that the ratio of the underlying medium etch rate to the mask etch rate is about 0.7 to 1.5. In some instances, the etch is selected so the underlying medium is etched at about the same rate as the mask.

The invention also relates to methods of employing the above etch. The method can include forming a mask over a medium on the optical component. The mask has an upper surface positioned over the underlying medium. At least a portion of the mask is etched down to the underlying medium. The etch is performed such that the rate at which the underlying medium is etched is about the same as the rate at which the mask is etched.

Because the etch rate is about the same, the topographical characteristics of the upper surface are transferred onto the underlying medium. For instance, the mask can include a vertical taper that can be transferred to the underlying surface. As a result, the etch can be employed to form a vertical taper on a variety of optical components such as mode transformers. Additionally, the etch can be employed to smooth a surface of the medium. For instance, the mask can be formed to have an upper surface that is smoother than the upper surface of the underlying medium. The etch can be employed to transfer the smooth upper surface of the mask to the surface of the underlying medium. As a result, the etch can serve as a planarization etch.

Figure 1A:
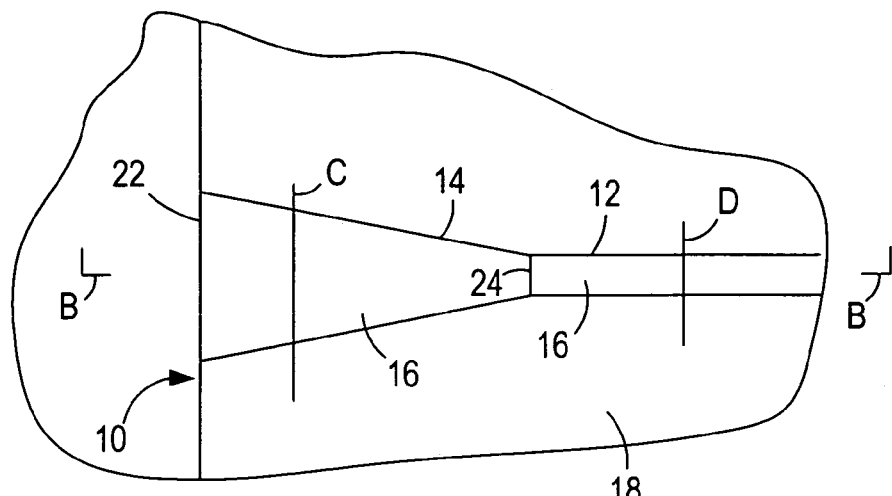
FIG. 1A is a topview of a portion of an optical component having a mode transformer. The mode transformer tapers vertically along a longitudinal axis.
Figure 1B:
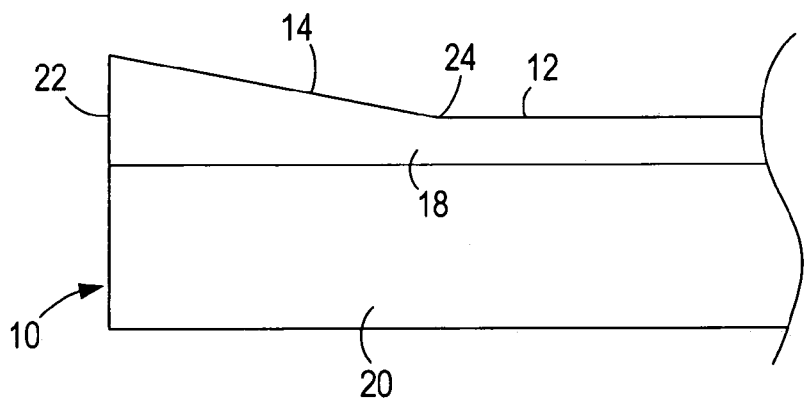
FIG. 1B is a cross section of the optical component shown in FIG. 1A taken between the brackets labeled B.
Figure 1C:
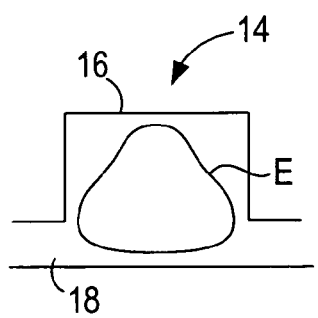
FIG. 1C is a cross section of the optical component shown in FIG. 1A taken along the lines labeled C.
Figure 1D:
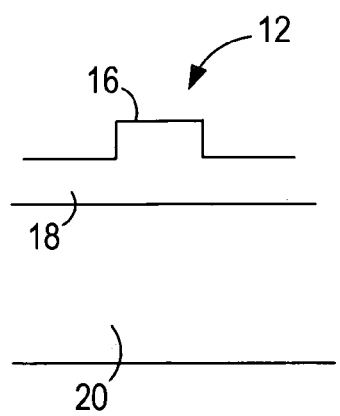
FIG. 1D is a cross section of the optical component shown in FIG. 1A taken along the lines labeled D.

FIG. 1A is a topview of a portion of an optical component 10 having a mode transformer. FIG. 1B is a cross section of the optical component 10 shown in FIG. 1A taken between the brackets labeled B. FIG. 1C is a cross section of the optical component 10 shown in FIG. 1A taken along the lines labeled C. FIG. 1D is a cross section of the optical component 10 shown in FIG. 1A taken along the lines labeled D.

The optical component 10 includes a waveguide 12 in optical communication with a mode transformer 14. The waveguide 12 and the mode transformer 14 are defined by a ridge 16 defined in a light transmitting medium 18 positioned on a base 20. Suitable light transmitting media include, but are not limited to, silicon, polymers, silica, SIN, GaAs, InP and LiNbO$_3$. The portion of the base 20 adjacent to the light transmitting medium 18 constrains the light signals within the ridge 16. A suitable base 20 for use with a silicon light transmitting medium 18, includes but is not limited to, a layer of silica over a silicon substrate as is present on a silicon-on-insulator wafer. The line labeled E in FIG. 1C illustrates the mode profile of a light signal carried in the mode transformer 14.

The cross section of the mode transformer 14 decreases from an expanded end 22 to a contracted end 24 interfaced with the waveguide 12. As a result, the mode size of a light signal traveling from the expanded end 22 to the contracted end 24 decreases. Alternatively, the mode size of a light signal expands as the light signal travels from the contracted end 24 to the expanded end 22. Although the mode transformer 14 is shown positioned at the edge of the optical component 10, the mode transformer 14 can be centrally positioned on an optical component 10.

The mode transformer 14 tapers in a horizontal direction and in a vertical direct. The combination of the vertical and horizontal taper can serve to reduce optical loss, reflection and/or excitement of higher order modes. The length of the horizontal taper can be different from the length of the vertical taper or the same as the length of the vertical taper.

Although FIG. 1A through FIG. 1D illustrate a mode transformer 14 that tapers vertically along a longitudinal axis, the mode transformer 14 can also taper vertically along a lateral axis. For instance, FIG. 1E is a cross section of an optical component 10 having a mode transformer 14 that tapers along a lateral axis. The taper need not be linear and can be curved as illustrated in FIG. 1F.

Figure 2B:
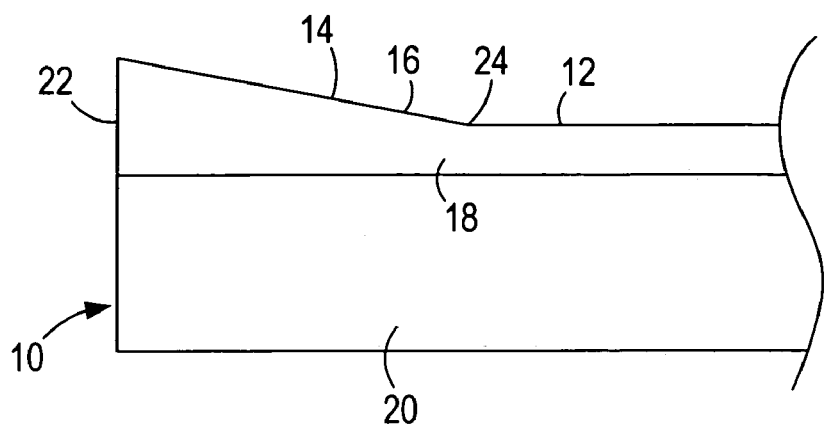
FIG. 2B is a cross section of the optical component shown in FIG. 2A taken between the brackets labeled B.
Figure 2C:
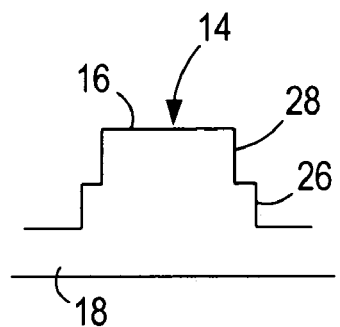
FIG. 2C is a cross section of the optical component shown in FIG. 2A taken along the line labeled C.
Figure 2D:
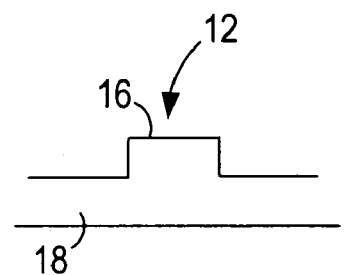
FIG. 2D is a cross section of the optical component shown in FIG. 2A taken along the line labeled D.

FIG. 2A is a topview of a portion of an optical component 10 having a mode transformer 14 with an upper region 28. FIG. 2B is a cross section of the optical component 10 shown in FIG. 2A taken between the brackets labeled B. FIG. 2C is a cross section of the optical component 10 shown in FIG. 2A taken along the line labeled C. FIG. 2D is a cross section of the optical component 10 shown in FIG. 2A taken along the line labeled D. The mode transformer 14 includes a lower region 26 that tapers horizontally and an upper region 28 that tapers horizontally and vertically. The horizontal taper rate of the upper region 28 can be the same or different than the horizontal taper rate of the lower region 26.

Although FIG. 2A through FIG. 2D illustrate the upper region 28 tapering horizontally, in some instances, the upper region 28 does not taper horizontally.

Although FIG. 2A through FIG. 2D illustrate a mode transformer 14 with a single upper region 28, the mode transformer 14 can include a plurality of upper regions 28 positioned on top of one another. When a mode transformer 14 includes a plurality of upper regions 28, the one or more upper regions 28 below the topmost upper region 28 need not include a vertical taper.

Figure 2E:
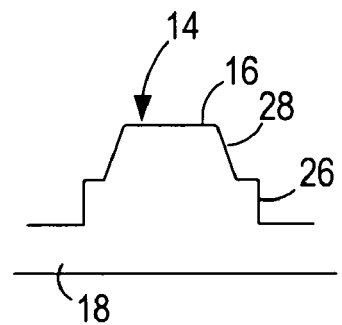
FIG. 2E is a cross section of an optical component having an upper region, a lower region and a mode transformer that tapers along a lateral axis.
Figure 2F:
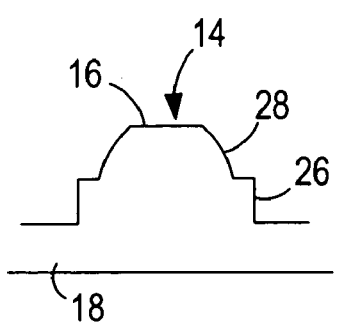
FIG. 2F is a cross section of an optical component having a mode transformer that tapers along a lateral axis. The taper is not linear and provides for a mode transformer having a curved vertical side.

Although FIG. 2A through FIG. 2D illustrate an upper region 28 that tapers vertically along a longitudinal axis, the mode transformer 14 can also taper vertically along a lateral axis. For instance, FIG. 2E is a cross section of an optical component 10 having a mode transformer 14 that tapers along a lateral axis. The taper need not be linear and can be curved as illustrated in FIG. 2F.

The rate of vertical taper along the longitudinal axis of the mode transformers 14 is shown as being linear in the above mode transformers 14. However, the rate of vertical taper need not be constant along the longitudinal axis of the mode transformer 14. Accordingly, the upper surface of the mode transformer 14 can be curved. For instance, the shape of the upper surface can be expressed as a polynomial function, a hyperbolic function or an elliptical function. Additionally, the horizontal tapers illustrated above need not be linear. Accordingly, the vertical sides of the mode transformer 14 can be curved. Additionally, a vertical taper and/or horizontal taper can occur in more than one stage.

Figure 3A:
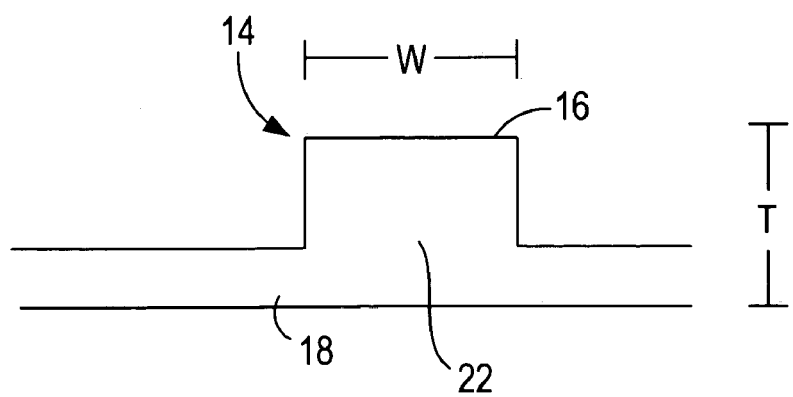
FIG. 3A is a cross section of the expanded end of a mode transformer constructed according to FIG. 1A through FIG. 1D.

As noted above, the mode transformer 14 contracts from an expanded end 22 down to a contracted end 24. FIG. 3A illustrates the cross section of an expanded end 22 on a mode transformer 14 constructed according to FIG. 1A through FIG. 1D. The expanded end 22 has a width labeled W and a thickness labeled T. When a mode transformer 14 is positioned at the edge of an optical component 10, the dimensions of the expanded end 22 are matched to an optical component 10 facet or to an optical fiber facet. A suitable width, W, includes, but is not limited to a width in the range of 8 µm–16 µm or 10 µm –14 µm. A suitable thickness, T, includes, but is not limited to, a thickness in the range of 8 µm –16 µm or 10 µm –14 µm.

Figure 3B:
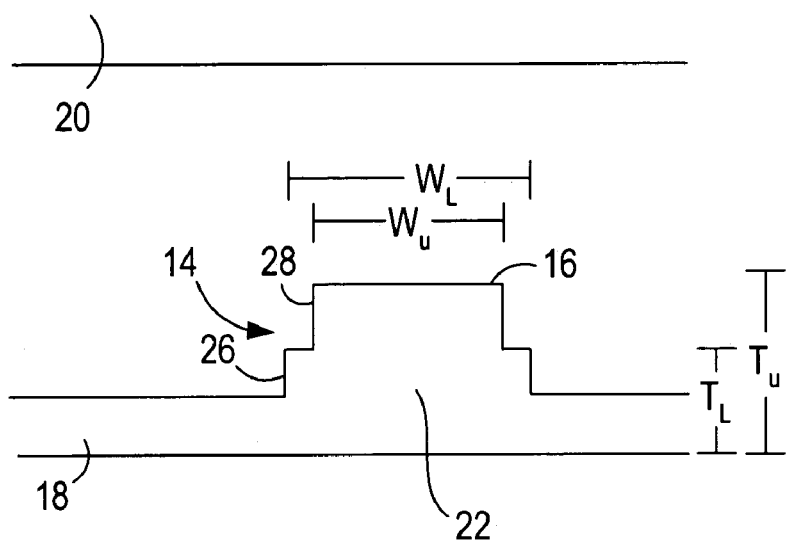
FIG. 3B is a cross section of an expanded end of a mode transformer constructed according to FIG. 2A through FIG. 2D.

FIG. 3B illustrates the cross section of an expanded end 22 on a mode transformer 14 constructed according to FIG. 2A through FIG. 2D. The upper region has a width labeled $W_U$ and the lower region has a width labeled $W_L$. A suitable upper region width, $W_U$, includes, but is not limited to, 8 µm–16 µm or 10 µm–14 µm. A suitable lower region width, $W_L$, includes, but is not limited to, 8 µm–20 µm or 10 µm–20 µm. The upper region has a thickness labeled $T_U$ and the lower region has a thickness labeled $T_L$. A suitable upper region thickness, $T_U$, includes, but is not limited to, a thickness in the range of 8 µm–16 µm or 10 µm–14 µm. A suitable lower region thickness, $T_L$, includes, but is not limited to, a thickness in the range of 2 µm–10 µm or 2 µm–5 µm.

Figure 3C:
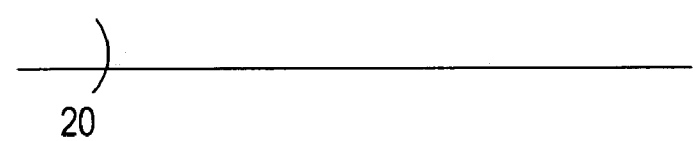
FIG. 3C is a cross section of a contracted end of a mode transformer.

FIG. 3C illustrates the cross section of a contracted end 24. The contracted and has a width labeled w and a thickness labeled t. The dimensions of the contracted end 24 are generally selected so the contracted end 24 provides an interface between the mode transformer 14 and a waveguide 12 on the optical component 10. A suitable width, w, includes, but is not limited to, a width in the range of 2 µm–10 µm or 2 µm–5 µm. A suitable thickness, t, includes, but is not limited to, a thickness in the range of 2 µm–10 µm, 2 µm–5 µm or 3 µm–4 µm.

A suitable thickness for the light transmitting medium in the slab region adjacent to the ridge 16 includes, but is not limited to, 1 µm–10 µm, 1 µm–4 µm or 2 µm–3.5 µm.

FIG. 4A through FIG. 4L illustrate a method for fabricating a mode transformer 14 according to FIG. 2A through FIG. 2D. The method can be adapted to fabricating a mode transformer 14 according to FIG. 1A through FIG. 1D as discussed in more detail below. The method can be performed on a wafer having a light transmitting medium 18 positioned on a base 20. An example of a suitable wafer includes, but is not limited to, a silicon-on-insulator wafer.

Figure 4A:
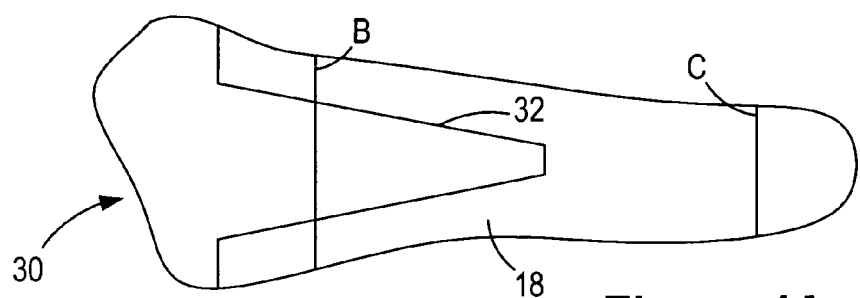
FIG. 4A through FIG. 4L illustrate a method for fabricating a mode transformer according to FIG. 2A through FIG. 2D.
Figure 4B:
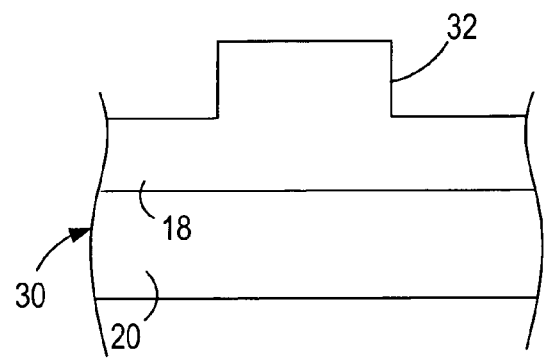
Figure 4C:
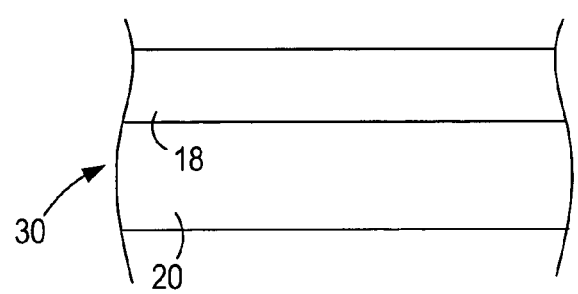

The wafer is masked, a first etch performed and the mask removed so as to provide the component precursor 30 illustrated in FIG. 4A through FIG. 4C. FIG. 4A is a topview of the component precursor 30. FIG. 4B is a cross section of the component precursor 30 shown in FIG. 4A taken along the line labeled B and FIG. 4C is a cross section of the component precursor 30 shown in FIG. 4A taken along the line labeled C. The first mask is formed so as to protect the region of the component precursor 30 where the upper region 28 is to be formed. An upper region precursor 32 remains in place on the component precursor 30 after the first etch is performed and the first mask is removed. As is evident from the upper region precursor 32 shown in FIG. 4A, the shape of the first mask defines the general shape of the horizontal taper that will be formed in the upper region 28.

Figure 4D:
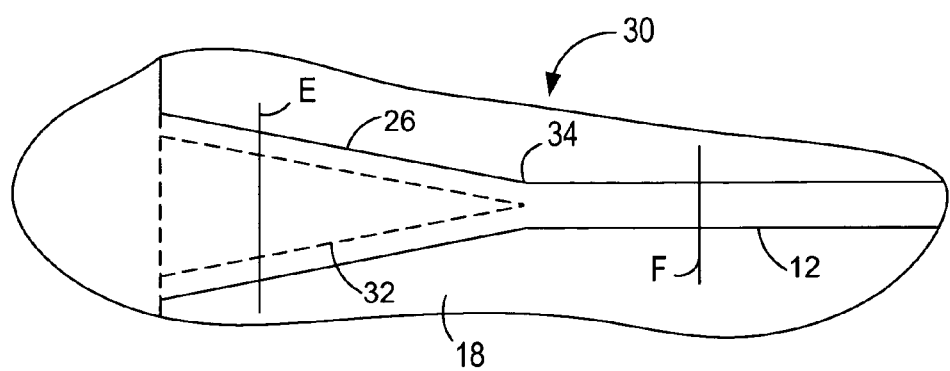
Figures 4E, 4F:
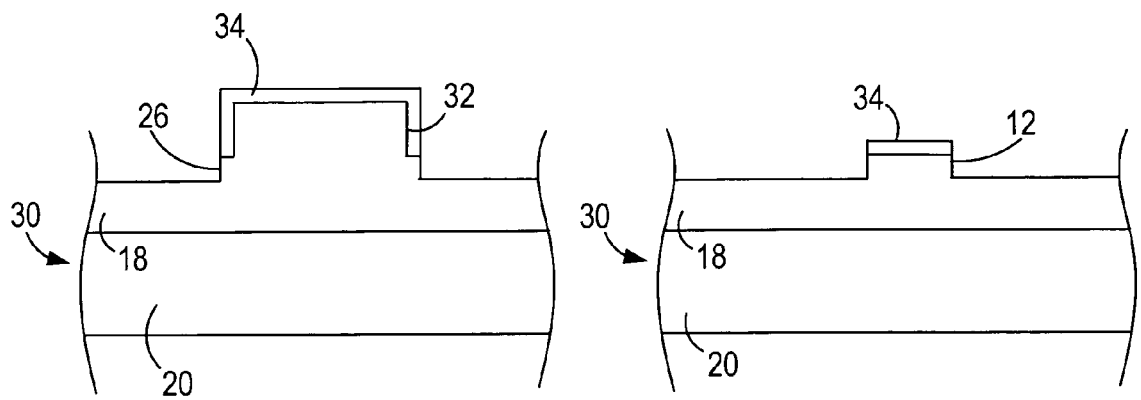

A second mask 34 is formed on the component precursor 30 and a second etch performed to provide the component precursor 30 illustrated in FIG. 4D through FIG. 4F. FIG. 4D is a topview of the component precursor 30. FIG. 4E is a cross section of the component precursor 30 shown in FIG. 4D taken along the line labeled E and FIG. 4F is a cross section of the component precursor 30 shown in FIG. 4D taken along the line labeled F. A suitable second mask 34 includes, but is not limited to, a photoresist. The second mask 34 is formed so as to protect the region of the component precursor 30 where the lower region 26 and waveguide 12 are to be formed. The location of the upper region precursor 32 under the second mask 34 is illustrated by the dashed lines in FIG. 4D. The second etch forms the sides of the waveguide 12 and the sides of the lower region 26.

Figure 4G:
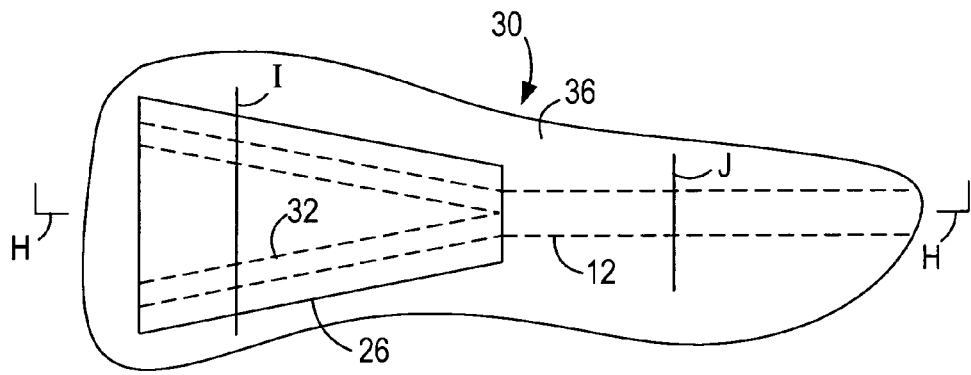
Figure 4H:
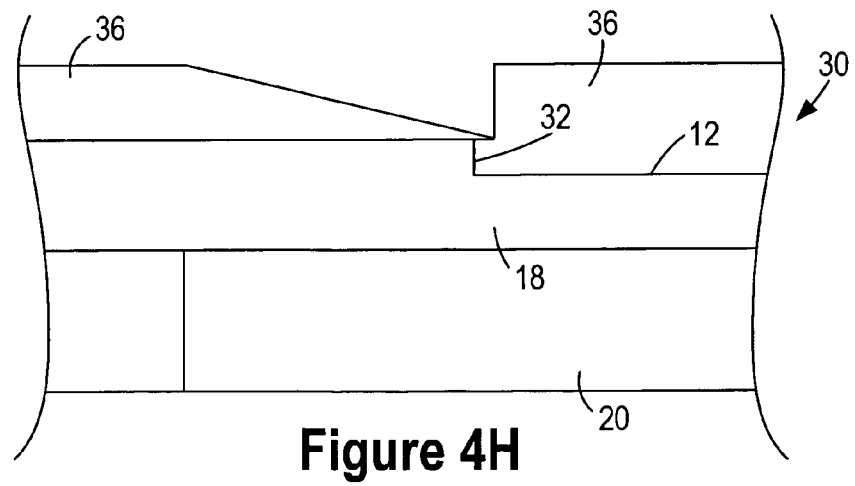
Figure 4I:
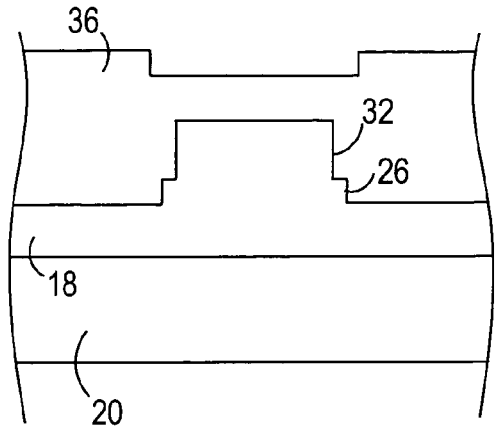
Figure 4J:
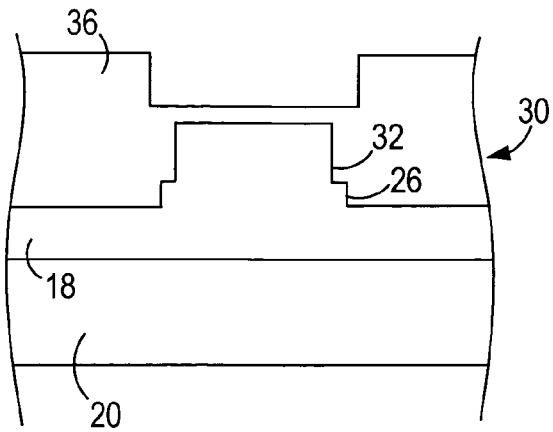

The second mask 34 is removed and a third mask 36 formed on the component precursor 30 to provide the component precursor 30 shown in FIG. 4G through FIG. 4J. FIG. 4G is a topview of the component precursor 30. FIG. 4H is a cross section of the component precursor 30 shown in FIG. 4G taken between the brackets labeled H. FIG. 4I is a cross section of the component precursor 30 shown in FIG. 4G taken along the line labeled I and FIG. 4J is a cross section of the component precursor 30 shown in FIG. 4G taken along the line labeled J. A suitable third mask 36 includes, but is not limited to, a photoresist. The dashed lines in FIG. 4G illustrate the location of the lower region 26 and the upper region precursor 32 under the third mask 36. The third mask 36 is formed over the waveguide 12 and at least a portion of the upper region precursor 32. The portion of the third mask 36 positioned over the section of the upper region precursor 32 where the vertical taper is to be formed is vertically tapered as is evident in FIG. 4H.

Figure 4K:
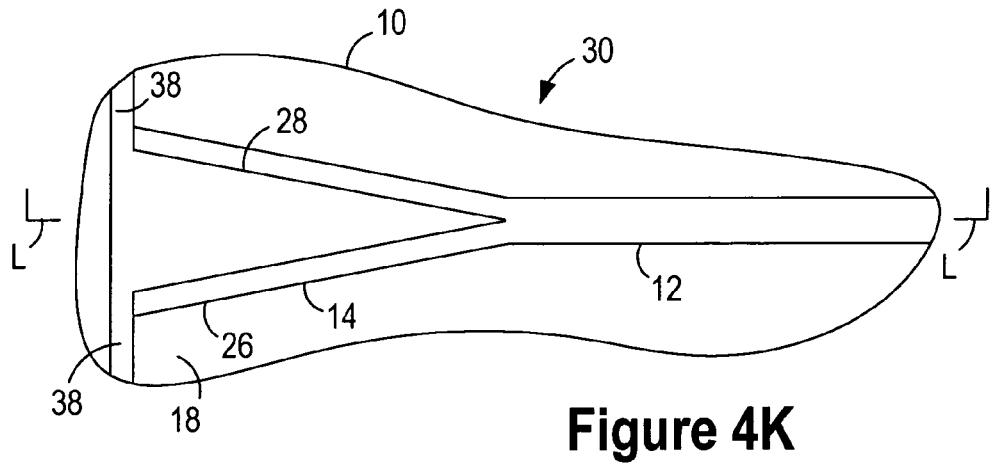
Figure 4L:
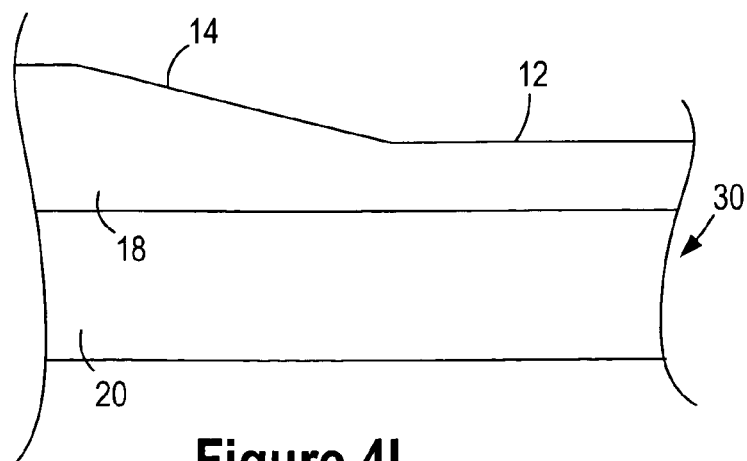

A third etch is performed, the remaining third mask 36 removed and the optical component separated from the wafer to provide the optical component 10 illustrated in FIG. 4K and FIG. 4L. FIG. 4K is a topview of the optical component 10. FIG. 4L is a cross section of the optical component 10 shown in FIG. 4K taken between the brackets labeled L. The third etch is performed so as to etch the third mask 36 over the waveguide 12 to the level of the waveguide 12. As evident in FIG. 4H, the portion of the third mask 36 over the waveguide 12 is thicker than a region of the third mask 36 located over the upper region precursor 32. As a result, the third etch etches through at least a portion of the third mask 36 located over the tapered region precursor. Once the third etch etches through the thinnest portion of the third mask 36, the third etch begins to concurrently etch light transmitting medium 18 previously protected by the third and a portion of the third mask 36. The third etch can be selected to etch the light transmitting medium 18 and the third mask 36 at about the same rate. Under these conditions the shape of the third mask 36 is transferred to the underlying portion of the component precursor 30. As a result, the vertical taper of the third mask 36 transfers to the upper region precursor 32 as is evident in FIG. 4L.

Although the third etch is disclosed above as being performed down to the level of the waveguide 12, the third etch can be stopped before the waveguide 12 is reached. If the component precursor 30 of FIG. 4G through FIG. 4J were not etched to the level of the waveguide 12, a reduced portion of the third mask 36 vertical taper would be transferred to the upper region precursor 32.

The edge of the optical component 10 is shown in FIG. 4K. The edge of the optical component 10 is formed when the optical component 10 is separated from the wafer. A variety of methods can be employed to separate the optical component 10 from the wafer. For instance, etching, cutting, dicing can be employed to separate an optical component 10 from a wafer. The optical component 10 is shown as being separated such that a ridge 40 extends along the perimeter of the optical component. The ridge is optional. For instance, the ridge can be removed through buffing or polishing. Alternatively, the optical component can be separated from the wafer such that the ridge is not present. For instance, the line of separation can be moved further toward the mode transformer. In some instances, the ridge is not removed and remains on the optical component 10.

Although the method disclosed in FIG. 4A through FIG. 4L is disclosed in the context of the mode transformer 14 shown in FIG. 2A through FIG. 2D, the method can be adapted to formation of the mode transformer 14 shown in FIG. 1A through FIG. 1D. More specifically, the second mask 34 can be formed so the sides of the second mask 34 are aligned with the sides of the upper region precursor 32 or are positioned within the perimeter of the upper region precursor 32. The second etch can then be performed so the upper region 28 and the lower region 26 blend together into a single structure.

FIG. 5A through FIG. 5L illustrate another method of forming a mode transformer 14 according to FIG. 1A through FIG. 1D. The method can be performed on a wafer having a light transmitting medium 18 positioned on a base 20. An example of a suitable wafer includes, but is not limited to, a silicon-on-insulator wafer.

Figure 5A:
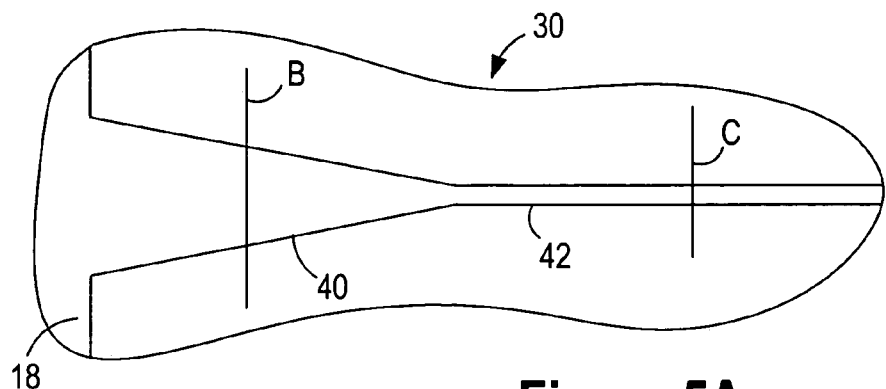
FIG. 5A through FIG. 5L illustrate a method of forming a mode transformer according to FIG. 1A through FIG. 1D.
Figure 5B:
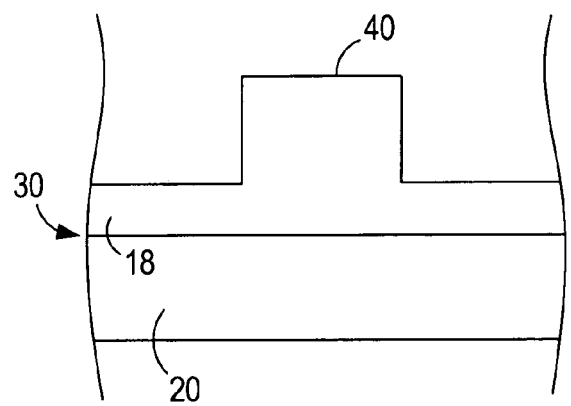
Figure 5C:
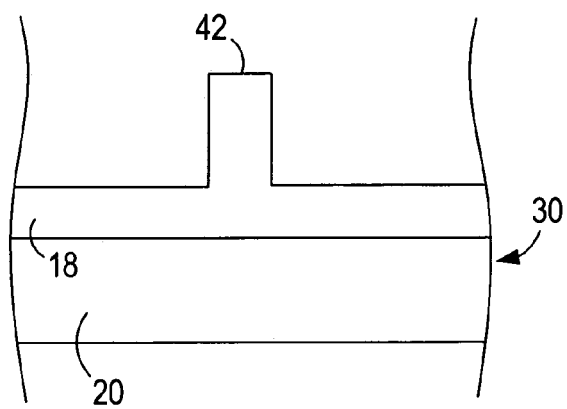

A first mask (not shown) is formed on the wafer, a first etch performed and the first mask removed so as to provide the component precursor 30 illustrated in FIG. 5A through FIG. 5C. FIG. 5A is a topview of the component precursor 30. FIG. 5B is a cross section of the component precursor 30 shown in FIG. 5A taken along the line labeled B and FIG. 5C is a cross section of the component precursor 30 shown in FIG. 5A taken along the line labeled C. The first mask is formed so as to protect the region of the component precursor 30 where the mode transformer 14 and waveguide 12 are to be formed. A mode transformer precursor 40 and a waveguide precursor 42 remain in place on the component precursor 30 after the first etch is performed and the first mask is removed. As is evident from the mode transformer precursor 40 shown in FIG. 5A, the shape of the first mask defines the general shape of the horizontal taper for the mode transformer.

Figure 5D:
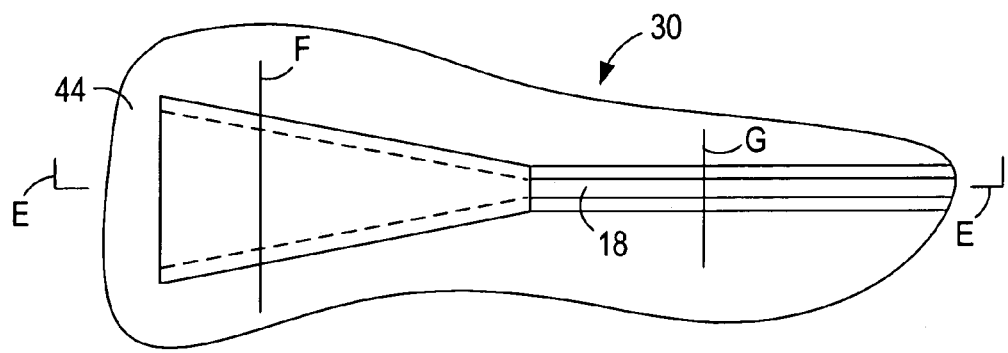
Figure 5E:
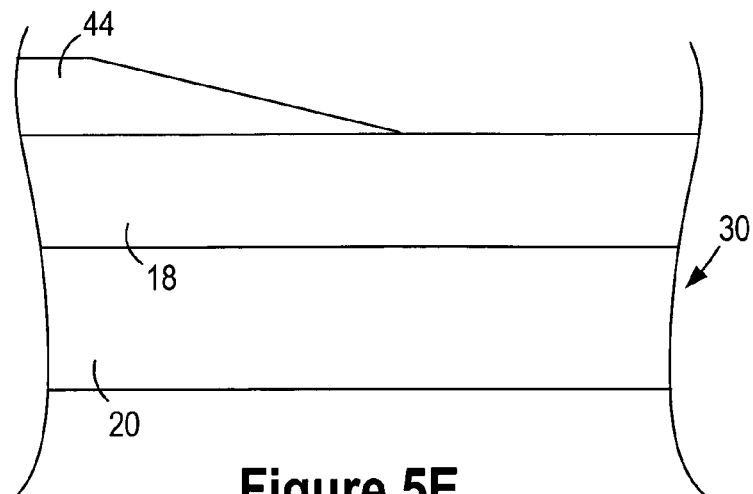
Figure 5F:
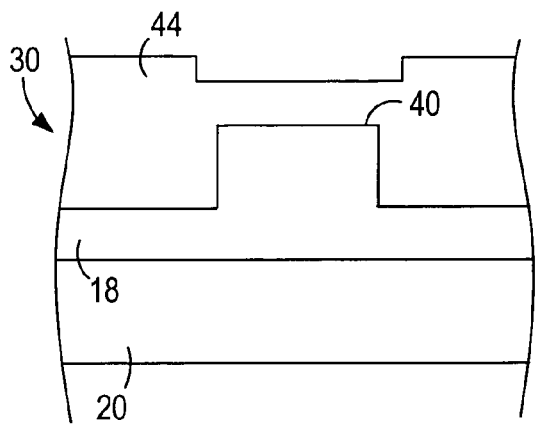
Figure 5G:
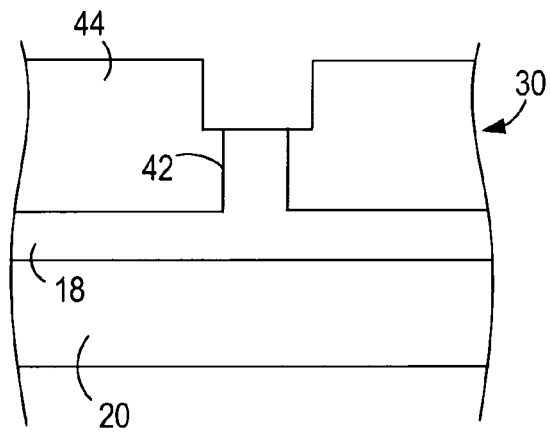

A second mask 44 is formed on the component precursor 30 so as to provide the component precursor 30 shown in FIG. 5D through FIG. 5G. FIG. 5D is a topview of the component precursor 30. FIG. 5E is a cross section of the component precursor 30 shown in FIG. 5D taken between the brackets labeled E. FIG. 5F is a cross section of the component precursor 30 shown in FIG. 5D taken along the line labeled F and FIG. 5G is a cross section of the component precursor 30 shown in FIG. 5D taken along the line labeled G. A suitable second mask 44 includes, but is not limited to, a photoresist. The dashed lines in FIG. 5D illustrate the location of the mode transformer precursor 40 under the second mask 44. At least a portion of the second mask 44 located over the mode transformer precursor 40 is vertically tapered as is evident in FIG. 5E. The top of the waveguide precursor 42 can be exposed as shown in FIG. 5D. Alternatively, a layer of the second mask 44 can protect the waveguide precursor 42. For instance, the thinnest portion of the second mask 44 located over the mode transformer precursor 40 can extend over the waveguide precursor 42.

Figure 5H:
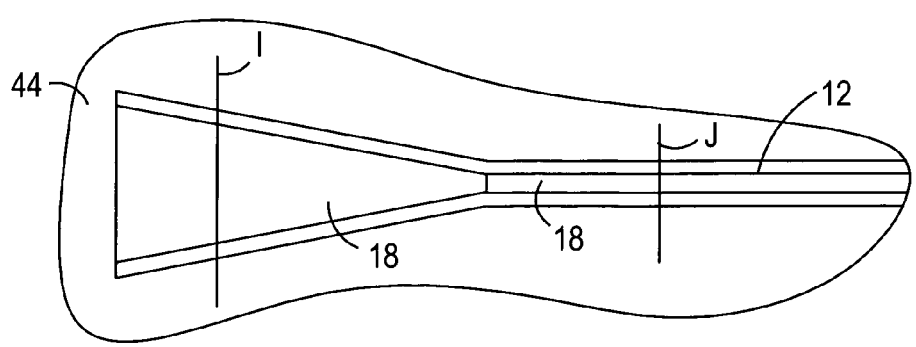
Figure 5I:
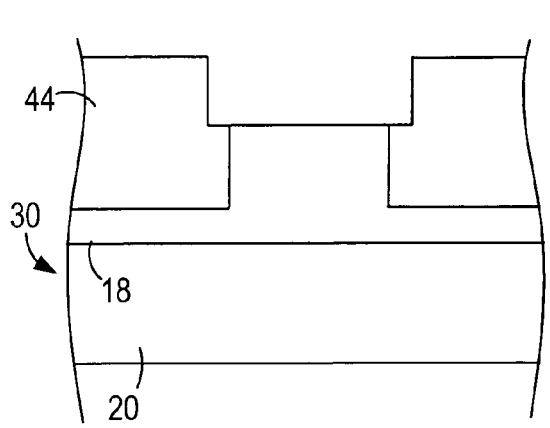
Figure 5J:
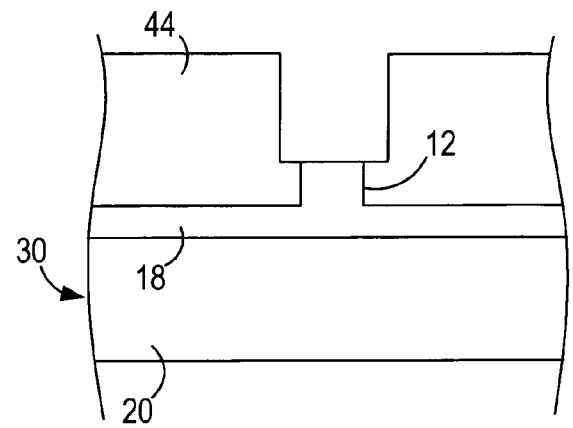

A second etch is performed so as to provide the component precursor 30 shown in FIG. 5H through FIG. 5J. FIG. 5H is a topview of the component precursor 30. FIG. 5I is a cross section of the component precursor 30 shown in FIG. 5H taken along the line labeled I. FIG. 5J is a cross section of the component precursor 30 shown in FIG. 5H taken along the line labeled J. The second etch is performed so as to etch the waveguide precursor 42 down to the desired thickness of the waveguide 12. As a result, the third etch etches through the tapered portions of the second mask 44 located over the mode transformer precursor 40 and begins concurrently etching the remaining second mask 44 and the light transmitting medium 18 in the mode transformer precursor 40.

Figure 5K:
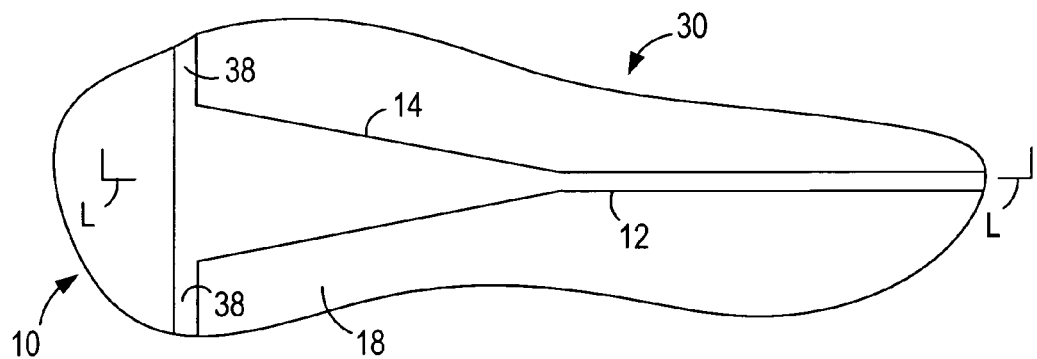
Figure 5L:
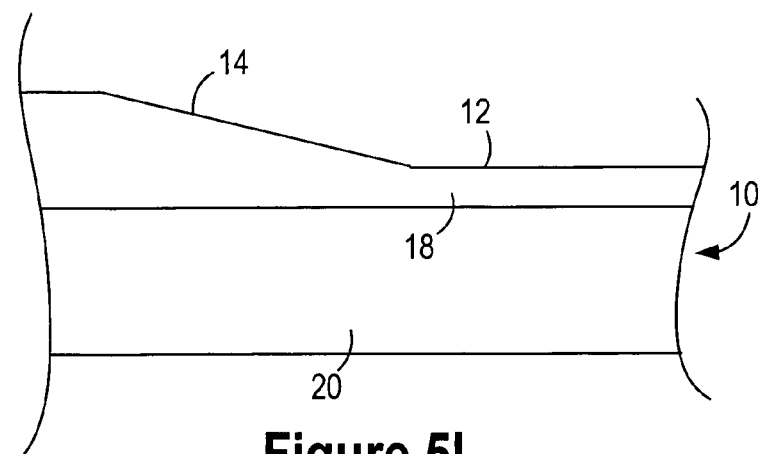

The remaining second mask 44 is removed and the optical component separated from the wafer to provide the optical component 10 illustrated in FIG. 5K and FIG. 5L. FIG. 5K is a topview of the optical component 10. FIG. 5L is a cross section of the optical component 10 shown in FIG. 5K taken between the brackets labeled L. The second etch, the second mask 44 and the light transmitting medium 18 can be selected such that the second etch etches the light transmitting medium 18 and the second mask 44 at about the same rate. Under these conditions the shape of the second mask 44 is transferred to the underlying portion of the component precursor 30. As a result, the vertical taper of the second mask 44 transfers to the mode transformer precursor 40 as is evident in FIG. 5L.

Although the second etch is disclosed above as being performed down to the level of the waveguide 12, the second etch can be stopped before the waveguide 12 is reached. If the component precursor 30 of FIG. 5H through FIG. 5J were not etched to the level of the waveguide 12, a reduced portion of the second mask 44 vertical taper would be transferred to the upper region 28.

The edge of the optical component 10 is shown in FIG. 5K and FIG. 5L. The edge of the optical component 10 is formed when the optical component 10 is separated from the wafer. A variety of methods can be employed to separate the optical component 10 from the wafer. For instance, etching, cutting, dicing can be employed to separate an optical component 10 from a wafer. The optical component 10 is shown as being separated such that a ridge 40 extends along the perimeter of the optical component. The ridge is optional. For instance, the ridge can be removed through buffing or polishing. Alternatively, the optical component can be separated from the wafer such that the ridge is not present. For instance, the line of separation can be moved further toward the mode transformer. In some instances, the ridge is not removed and remains on the optical component 10.

Figure 6A:
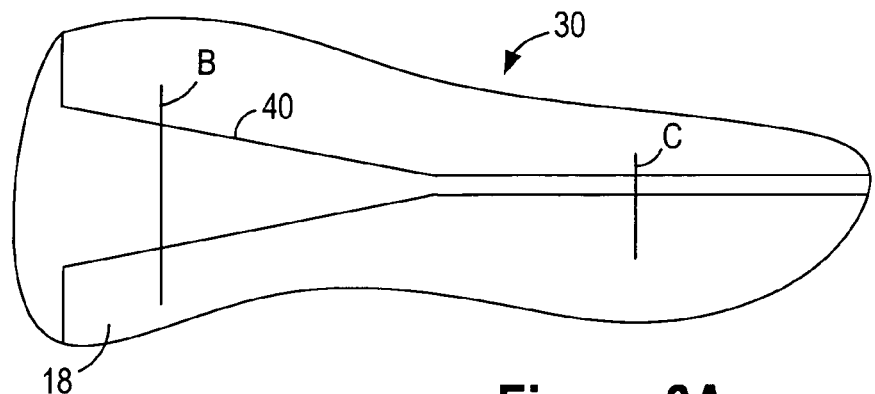
FIG. 6A through FIG. 6O illustrate another method for forming a mode transformer.
Figures 6B, 6C:
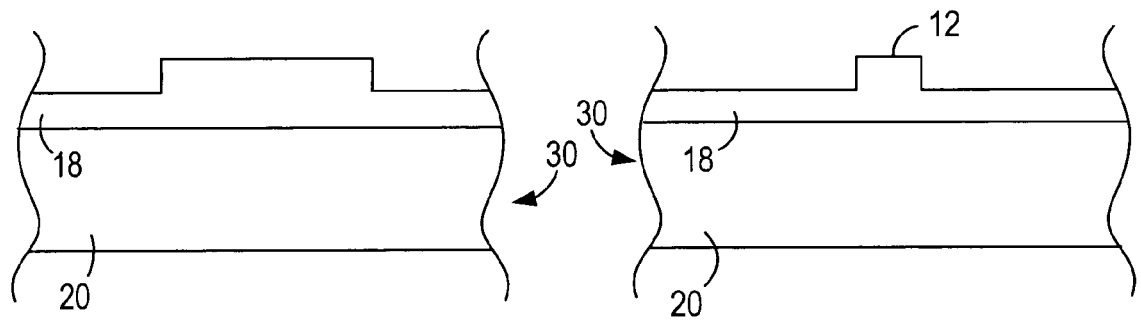
Figure 6D:
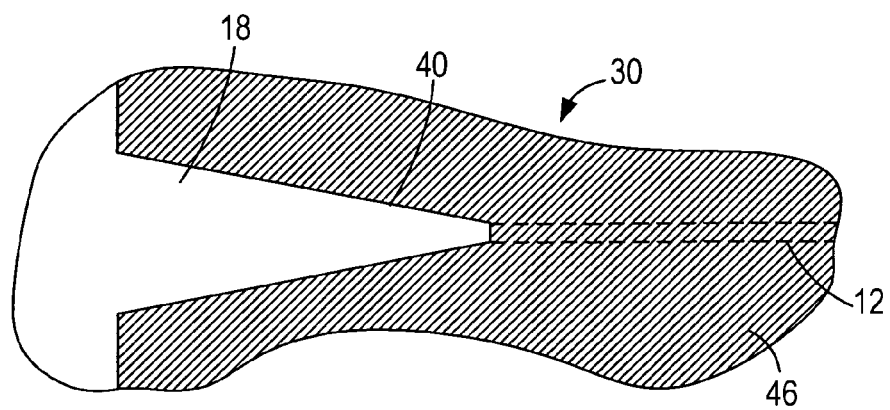
Figure 6E:
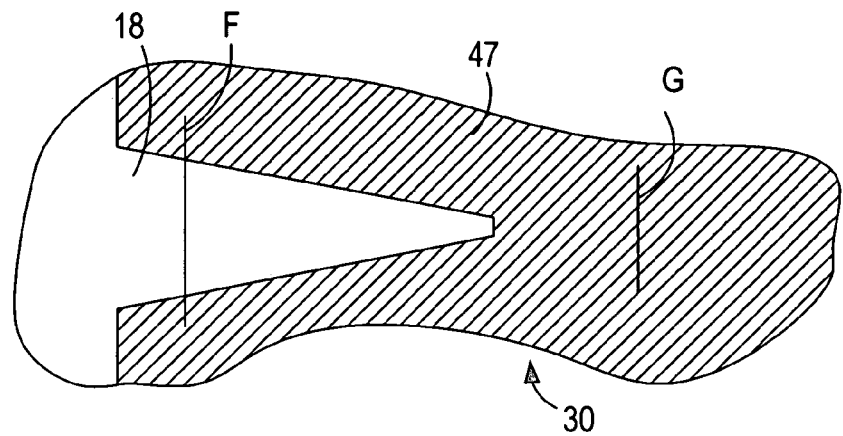
Figure 6H:
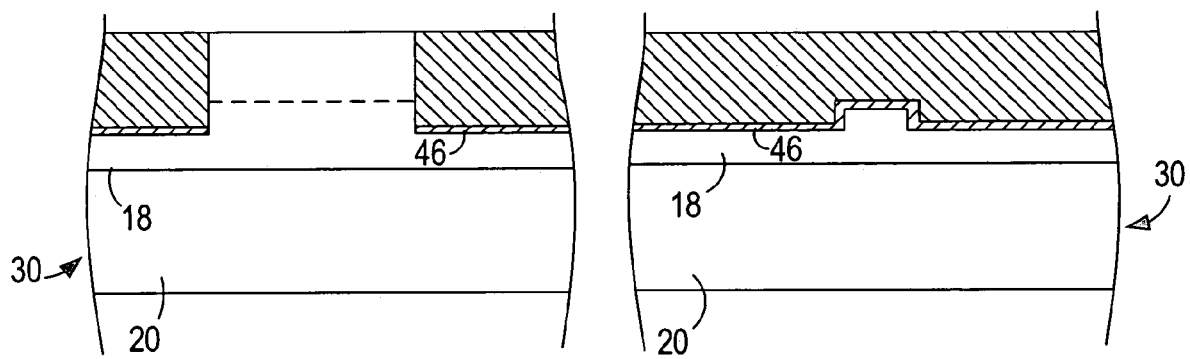
Figure 6H:
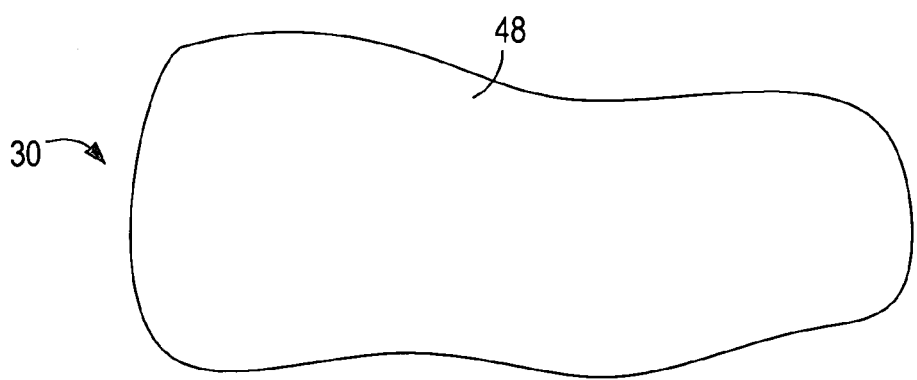
Figure 6I:
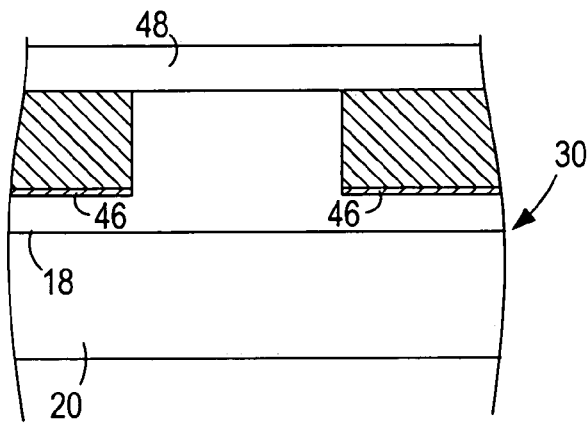
Figure 6J:
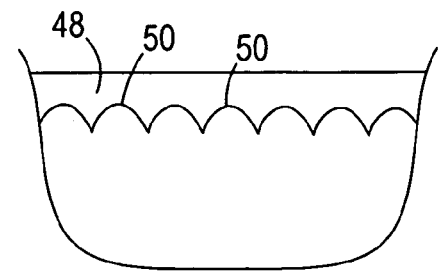
Figure 6K:
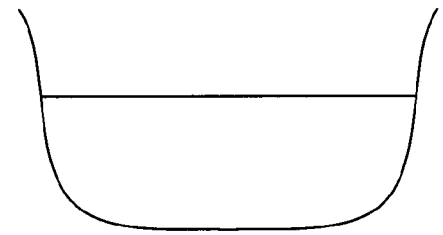
Figure 6L:
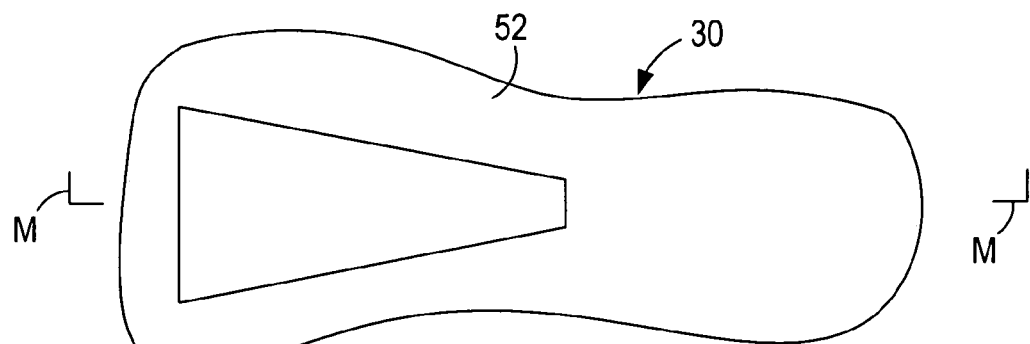
Figure 6M:
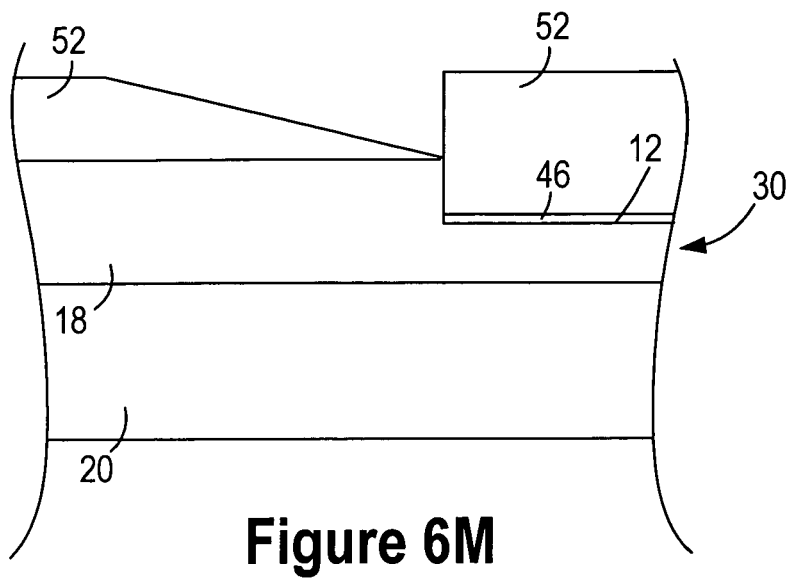
Figure 6N:
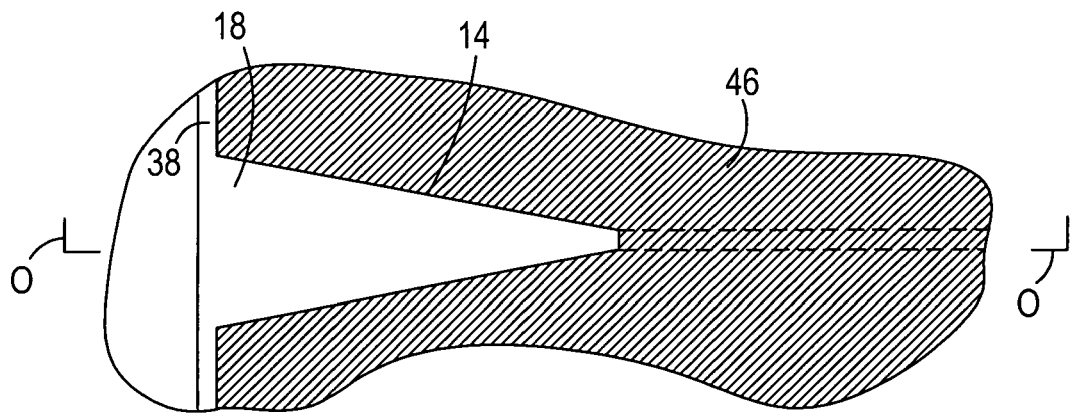
Figure 6O:
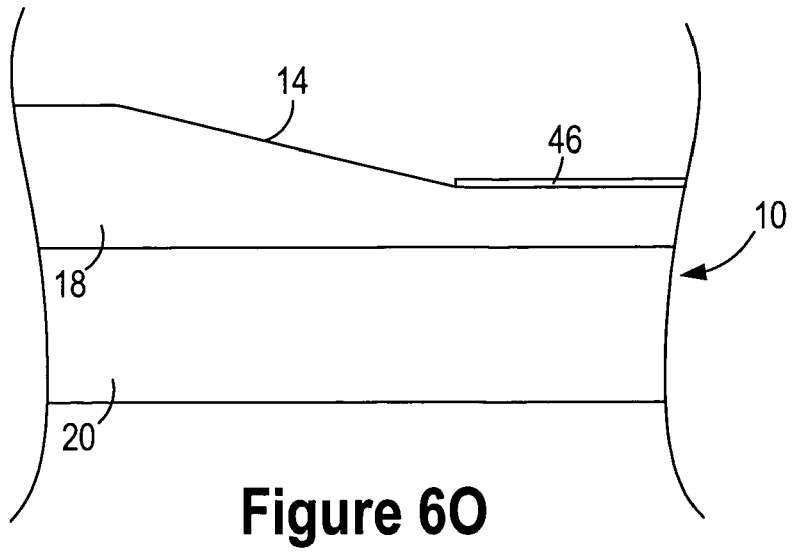

FIG. 6A through FIG. 6O illustrate another method for forming a mode transformer 14. The method employs epitaxial growth and a planarization etch. The method can be performed on a wafer having a light transmitting medium 18 positioned on a base 20. The light transmitting medium 18 on the base 20 should be as thick as the desired thickness of the waveguide in optical communication with a mode transformer. An example of a suitable wafer includes, but is not limited to, a silicon-on-insulator wafer.

A first mask (not shown) is formed on the wafer, a first etch performed and the mask removed so as to provide the component precursor 30 illustrated in FIG. 6A through FIG. 6C. FIG. 6A is a topview of the component precursor 30. FIG. 6B is a cross section of the component precursor 30 shown in FIG. 6A taken along the line labeled B and FIG. 6C is a cross section of the component precursor 30 shown in FIG. 6A taken along the line labeled C. The first mask is formed so as to protect the region of the component precursor 30 where the mode transformer and waveguide are to be formed. The first etch results in the formation of a waveguides 12 and a mode transformer precursor 40 on the component precursor 30. As is evident from FIG. 6A, the shape of the first mask defines the general shape of the horizontal taper for the mode transformer.

A second mask 46 is formed on the component precursor 30 so as to provide the component precursor 30 shown in FIG. 6D. The second mask 46 is formed such that a portion of the mode transformer precursor 40 remains exposed and the waveguide 12 is protected. A suitable second mask 46 includes, but is not limited to, a hard mask such as $SiO_2$. The dashed lines shown in FIG. 6D illustrate the location of the waveguide 12 under the second mask 46. When the mode transformer 14 is to be constructed according to FIG. 1A through FIG. 1C, the upper surface of the entire mode transformer precursor 40 can remain exposed as shown in FIG. 6D. When the mode transformer 14 is to be constructed according to FIG. 2A through FIG. 2C, the mode transformer precursor 40 illustrated in FIG. 6D can serve as the lower region 26 of the mode transformer 14 shown in FIG. 2A. Accordingly, the second mask 46 is formed such that a portion of the mode transformer precursor 40 to be located under the upper region 28 remain exposed. When the light transmitting medium 18 is silicon, a suitable second mask 46 is a silica mask.

Additional light transmitting medium 18 is grown on the component precursor 30 of FIG. 6D so as to provide the optical component 10 illustrated in FIG. 6E through FIG. 6G. FIG. 6E is a topview of the component precursor 30. FIG. 6F is a cross section of the component precursor 30 shown in FIG. 6E taken along the line labeled F. FIG. 6G is a cross section of the component precursor 30 shown in FIG. 6E taken along the line labeled G. When the light transmitting medium 18 is silicon, epitaxial (EPI) growth can be employed to grow additional silicon on the component precursor 30. The silicon will grow on a silica mask as polysilicon 47 and on the exposed portion of the mode transformer precursor 40 as silicon. The silicon and polysilicon grow at about the same rate. The dashed line in FIG. 6F illustrates the thickness of the silicon in the mode transformer precursor 40 before the additional silicon is grown on the component precursor 30.

Although the layer upon which additional material is grown is described above as a second mask 46, the layer need not be a traditional mask material and, in some instances, can be a seed layer selected to achieve growth of a particular material.

A third mask 48 is grown on the component precursor 30 of FIG. 6E through FIG. 6G so as to provide the component precursor 30 shown on FIG. 6H and FIG. 6I. FIG. 6H is a topview of an component precursor 30 and FIG. 6I is a cross section of the component precursor 30 shown in FIG. 6H taken along a line extending through the mode transformer precursor 40.

The surface of grown polysilicon often has an undesirably high roughness. FIG. 6J is a close-up of the polysilicon surface. The bumps 50 illustrate the roughness of the polysilicon layer. The third mask 48 is selected to fill in the gaps between the bumps 50 on the polysilicon and have an upper surface that is smoother than the polysilicon. A suitable third mask 48 includes, but is not limited to, a photoresist formed on the component precursor 30 by spin coating. The surface of EPI grown polysilicon typically has a smoothness of about 500 nm to 1000 nm while the upper surface of photoresist can have a smoothness better than 100 nm, 10 nm or 1 nm.

A second etch is performed on the component precursor 30 of FIG. 6H and FIG. 6I. The second etch can be performed for a duration sufficient to etch through at least a portion of the third mask 48 and to begin concurrently etching the third mask 48 and polysilicon that was previously protected by the third mask 48. Additionally, the second etch can be selected to etch the third mask 48 and the polysilicon at about the same rate. Etching the third mask 48 and the polysilicon at about the same rate causes the smoothness of the third mask 48 upper surface to be substantially transferred onto the polysilicon as shown in FIG. 6K. Accordingly, the second etch smoothes the upper surface of the polysilicon. In some instances, the second etch smoothes the surface of the polysilicon to a smoothness better than 100 nm, 10 nm or 1 nm.

The second etch can be selected to etch the polysilicon and the silicon at about the same rate. Accordingly, the third etch can serve to smooth the silicon surface as well as the polysilicon surface. The remaining polysilicon can be removed by protecting the mode transformer and etching the polysilicon down to the second mask. The etch can be selected so the second mask effectively serves as an etch stop.

A fourth mask 52 is formed on the component precursor 30 as illustrated in FIG. 6L and FIG. 6M. FIG. 6L is a topview of the component precursor 30 and FIG. 6M is a cross section of the component precursor 30 shown in FIG. 6L taken along a line extending between the brackets labeled M. A suitable fourth mask 52 includes, but is not limited to, a photoresist. The fourth mask 52 is formed so as to protect the waveguides 12. At least a portion of the fourth mask 52 located over the mode transformer precursor 40 is vertically tapered as is evident in FIG. 6M.

A third etch is performed and the optical component separated from the wafer to provide the component precursor 30 shown in FIG. 6N and FIG. 6O. FIG. 6N is a topview of the component precursor 30. FIG. 6O is a cross section of the component precursor 30 shown in FIG. 6N taken along a line extending between the brackets labeled 0. The third etch is performed so as to etch the fourth mask 52 down to the level of the polysilicon. As a result, the third etch etches through the tapered portions of the fourth mask 52 located over the mode transformer precursor 40 and begins to etch the light transmitting medium 18 in the mode transformer precursor 40.

The third etch can be selected so as to etch the light transmitting medium 18 and the fourth mask 52 at about the same rate. Under these conditions the shape of the fourth mask 52 is transferred to the underlying portion of the component precursor 30. As a result, the vertical taper of the fourth mask 52 transfers to the mode transformer precursor 40 as shown in FIG. 6O.

Although the third etch is disclosed above as being performed down to the level of the polysilicon, the third etch can be stopped before the polysilicon is reached. If the component precursor 30 of FIG. 6L and FIG. 6M were not etched to the level of the waveguide 12, a reduced portion of the fourth mask 52 vertical taper would be transferred to the mode transformer precursor 40.

The edge of the optical component 10 is shown in FIG. 4K and FIG. 4L. The edge of the optical component 10 is formed when the optical component 10 is separated from the wafer. A variety of methods can be employed to separate the optical component 10 from the wafer. For instance, etching, cutting, dicing can be employed to separate an optical component 10 from a wafer. The optical component 10 is shown as being separated such that a ridge 40 extends along the perimeter of the optical component. The ridge is optional. For instance, the ridge can be removed through buffing or polishing. Alternatively, the optical component can be separated from the wafer such that the ridge is not present. For instance, the line of separation can be moved further toward the mode transformer. In some instances, the ridge is not removed and remains on the optical component 10.

The methods discussed with respect to FIG. 4A through FIG. 6O each employ a mask having a vertically tapered region. FIG. 7A through FIG. 7J illustrate a method of forming a mask having a vertically tapered region.

Figure 7A:
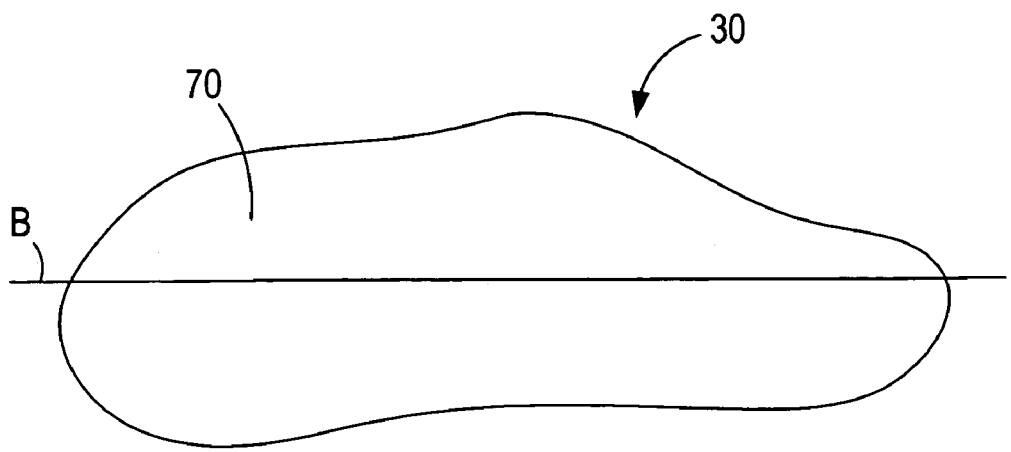
FIG. 7A through FIG. 7J illustrate a method of forming a mask having a vertically tapered region.
Figure 7B:
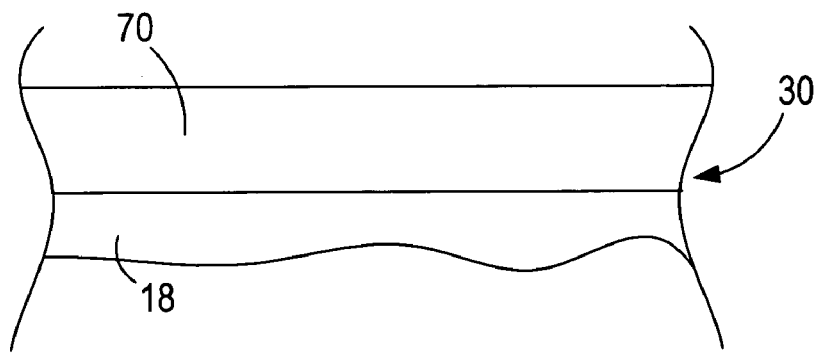

FIG. 7A through FIG. 7I illustrate a suitable method for generating a mask having a vertically tapered region. FIG. 7A is a topview of a component precursor 30. FIG. 7B is a cross section of the component precursor 30 taken along the line labeled B. A mask precursor 70 is formed on the component precursor 30. As will become evident below, the mask is formed from the mask precursor 70. A suitable mask precursor 70 includes, but is not limited to, a photoresist.

Suitable mask precursors 70 are precursors that can be developed by exposing the mask precursor 70 to energy from an energy source. Developing a mask precursor 70 causes the mask precursor 70 to transition from a first state to a second state or from a first medium to a second medium. For the purposes of illustrating the following method, the mask precursor 70 is a photoresist and the energy source is a light source. The light source can be employed to develop the photoresist. A suitable method of forming a photoresist on the component precursor 30 includes, but is not limited to, spin coating. Spin coating can be employed so the photoresist fills in low points on the component precursor and provides the photoresist with a planar upper surface. As a result, the interface between the component precursor 30 can be three dimensional rather than the two dimensional interface illustrated in FIG. 7B.

Figure 7C:
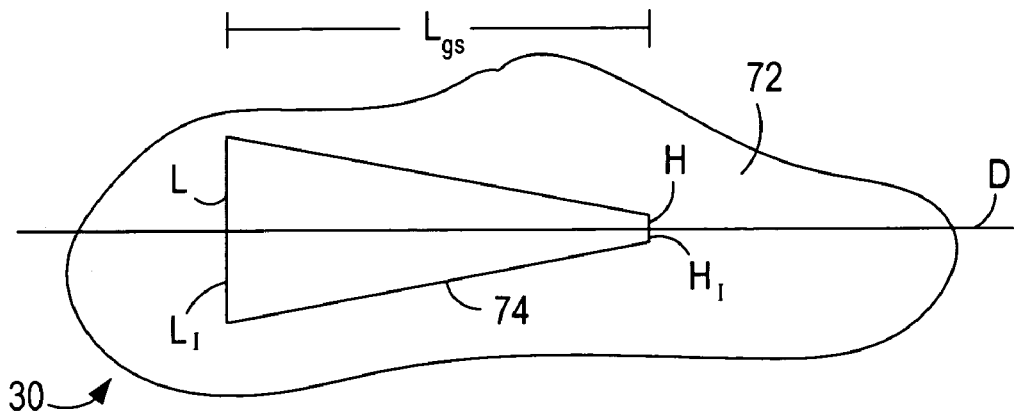
Figure 7D:
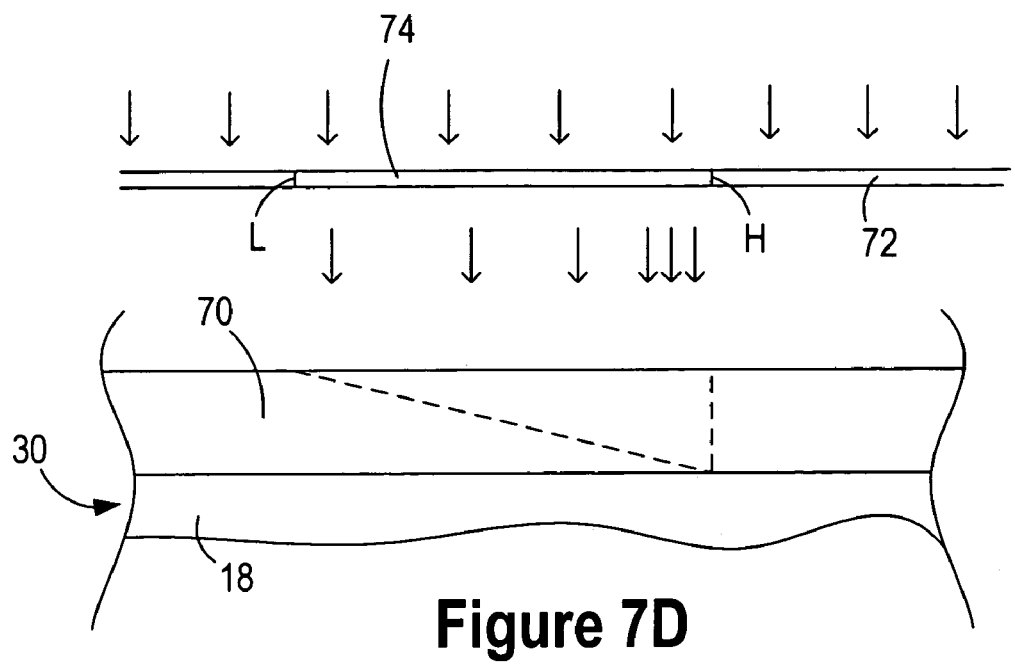

The photoresist is exposed to light through a photomask 72 to develop a portion of the mask precursor 70 as illustrated in FIG. 7C through FIG. 7D. FIG. 7C is a topview of the component precursor 30 having a photomask 72 positioned over the component precursor 30. FIG. 7D is a cross section of the component precursor 30 taken along the line labeled D in FIG. 7C. The photomask 72 includes a gray scale region 74 that is aligned with region of the component precursor 30 where the vertical taper is to be formed. The gray scale region 74 includes a length labeled $L_{gs}$. The gray scale region 74 is configured such that the intensity of the light transmitted through the gray scale region 74 changes along the length of the gray scale region 74, $L_{gs}$. For instance, the gray scale region 74 can be constructed so less light is transmitted through a low intensity end labeled $L_1$ and more light is transmitted through a high intensity end labeled $H_1$. As a result, for a given duration of light exposure, the portion of the mask precursor 70 positioned under the low intensity end of the gray scale region 74 receive less light than the portion of the mask precursor 70 positioned under the high intensity end of the gray scale region 74. Accordingly, a thinner portion of the mask precursor 70 positioned under the low intensity end, $L_1$, is developed than the portion of the mask precursor 70 positioned under the high intensity end, $H_1$. For instance, the dashed line in FIG. 7D can illustrate the pattern of development in the mask precursor 70.

FIG. 7D illustrates the portion of the photomask 72 outside of the gray scale region 74 transmitting very little light. More specifically, the portion of the photomask 72 outside the gray scale region 74 has about the same light transmission characteristics as the low intensity end, $L_1$, of the gray scale region 74. As a result, the portion of the mask precursor 70 that is not under the gray scale region 74 is not developed. Accordingly, the dashed line in FIG. 8D illustrates the pattern of development that would result from use of the photomask 72 illustrated in FIG. 7D.

Figure 7E:
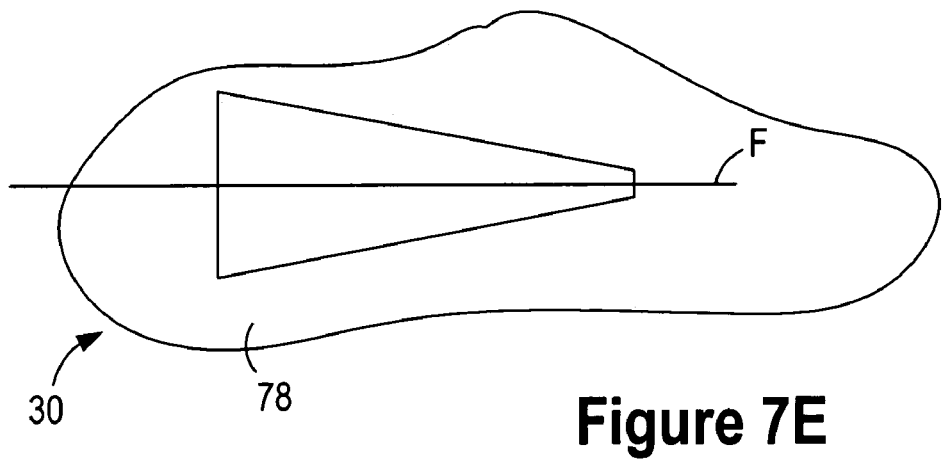
Figure 7F:
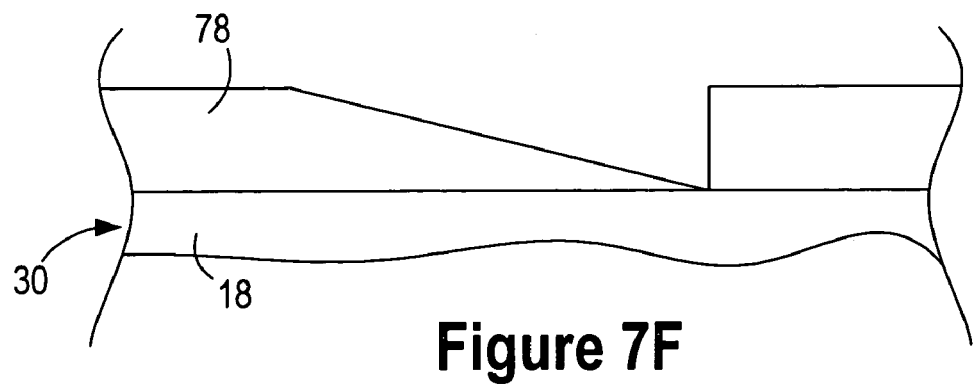

The developed portions of the mask precursor 70 are removed to provide the component precursor 30 illustrated in FIG. 7E and FIG. 7F. FIG. 7E is a topview of the component precursor 30. FIG. 7F is a cross section of the component precursor 30 taken along the line labeled A in FIG. 7E. The undeveloped portions of the mask precursor 70 remain in place on the component precursor 30 and serve as the mask 78. Accordingly, the portion of the mask precursor 70 under the dashed line of FIG. 7D remain in place on the component precursor 30. The thickness of the mask 78 tapers along the length of the mask 78. The photomask 72 discussed with respect to FIG. 7C and FIG. 7D would be appropriate for use with the method of FIG. 4A through FIG. 4F and/or the method of FIG. 6A through FIG. 6O.

Figure 7G:
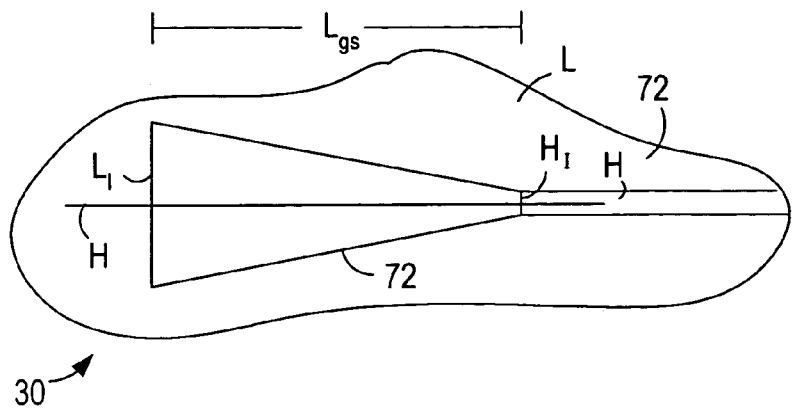
Figure 7H:
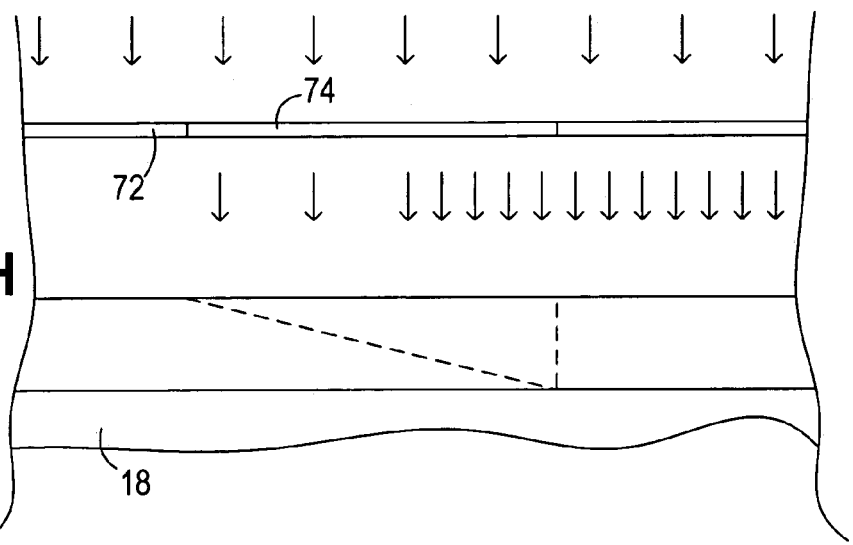
Figure 7I:
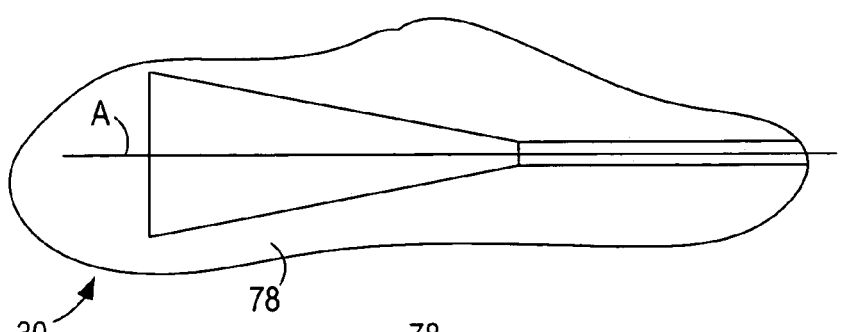

FIG. 7G through FIG. 7J illustrate a photomask 72 that is suitable for use with the method of FIG. 5A through FIG. 5L. FIG. 7G is a topview of the component precursor 30 having a photomask 72 positioned over the component precursor 30. FIG. 7H is a cross section of the component precursor 30 taken along the line labeled H in FIG. 7G. The portion of the photomask 72 outside of the gray scale region 74 includes a high intensity region labeled H and a low intensity region labeled L. The high intensity region, H, has about the same light transmission characteristics as the high intensity end, $H_1$, of the gray scale region 74 and the low intensity region, L, has about the same light transmission characteristics as the low intensity end, $L_1$, of the gray scale region 74. The dashed line in FIG. 7I illustrates the resulting development pattern. Because the high intensity region, H, has about the same light transmission characteristics as the high intensity end, $H_1$, of the gray scale region 74, the portion of the component precursor 30 under the high intensity region, H, is developed to about the same depth as the portion of the component precursor 30 under the low intensity end, $H_1$, of the gray scale region 74.

Figure 7J:
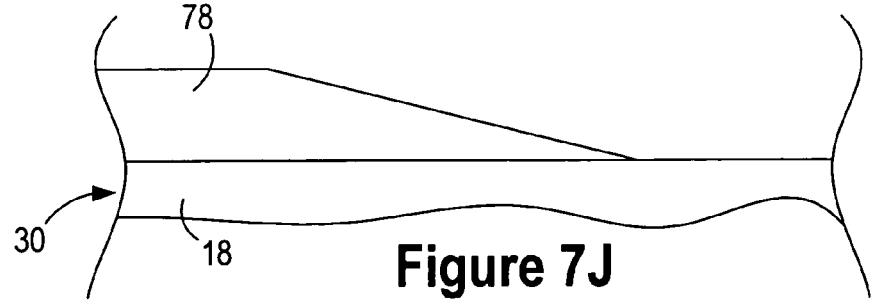

The developed portions of the mask precursor 70 are removed to provide the component precursor 30 illustrated in FIG. 7I and FIG. 7J. FIG. 7I is a topview of the component precursor 30. FIG. 7J is a cross section of the component precursor 30 taken along the line labeled A in FIG. 7I. The undeveloped portions of the mask precursor 70 remain in place on the component precursor 30 and serves as the mask. Accordingly, the portion of the mask precursor 70 under the dashed line of FIG. 7H remain in place on the component precursor 30. The thickness of the mask tapers along the length of the mask. The photomask 72 discussed with respect to FIG. 7G and FIG. 7H would be appropriate for use with the method of FIG. 5A through FIG. 5L. For instance, the high transmission region of the photomask 72 can be aligned with the region of the component precursor 30 where the waveguide 12 is to be formed to form the second mask illustrated in 5D.

The vertical taper of a mode transformer 14 need not be linear along the longitudinal length of the mode transformer 14. The pattern of light transmission through the gray scale region 74 of the photomask 72 can be changed so as to achieve a particular contour along the longitudinal axis of the mode transformer 14. Additionally, the mode transformer 14 can taper along a lateral axis of the mode transformer 14 as noted with respect to FIGS. 1E, 1F, 2E and 2F. The pattern of light transmission through the gray scale region 74 of the photomask 72 can be changed so as to achieve a particular contour along a lateral axis of the mode transformer 14. For instance, when the light transmission characteristics of the photomask 72 change along a lateral axis of the gray scale region 74 the thickness of the mode transformer 14 will change along a lateral axis of the mode transformer 14.

Although FIG. 7A through FIG. 7J is disclosed in the context of forming a single region having a vertical taper on a mask. The photomask 72 can be constructed with a plurality of gray scale regions 74. As a result, a mask can be formed with plurality of vertically tapered regions. The mask can then be used to form a plurality of vertically tapered regions on an optical component 10 and/or on a wafer.

Each of the methods described above include one or more steps where a particular etch selectivity is desired. For instance, each of the method described above includes one or more steps where a medium on the optical component precursor is etched at about the same rate as a mask. A suitable etchant includes a first etchant and one or more second etchants having the general formula $C_xH_yF_z$ where X=one or greater, Y=zero or greater, and Z=1 or greater. In some instances, the etchant includes a first etchant and one or more second etchants selected from the group consisting of $CF_4$, $CHF_3$, $CH_2F_2$, $C_2F_6$, $C_4F_6$, and $C_4F_8$. A suitable first etchant includes, but is not limited to, a fluorine containing gas.

When the mask is a photoresist and/or the light transmitting medium is silicon and/or silica, a suitable etchant includes $SF_6$ as the first etchant and one or more second etchants having the general formula $C_xH_yF_z$ where X=one or greater, Y=zero or greater, and Z=1 or greater. In some instances, the etchant includes $SF_6$ as the first etchant and one or more second etchants selected from the group consisting of $CF_4$, $CHF_3$, $CH_2F_2$, $C_2F_6$, $C_4F_6$, and $C_4F_8$. When the mask is a photoresist and/or the light transmitting medium is silicon and/or silica, a preferred etchant includes $SF_6$ as the first etchant and $CF_4$ as the second etchant.

The etchants described above can be applied to a component precursor under conditions where a ratio of the medium etch rate to the mask etch rate is less than about 1.5:1, 1.3:1, 1.2:1, 1.1:1 or 1.02:1 and/or greater than 0.7:1, 0.8:1, 0.9:1 or 0.98:1. Suitable selectivities can be achieved when the etching medium has a molar ratio of first etchant to second etchant in the range of 0.005:1 to 0.25:1, in the range of 0.01:1 to 0.2:1, in the range of 0.02:1 to 0.2:1, in the range of 0.05:1 to 0.2:1 or, in the range of 0.05:1 to 0.15:1. When the first etchant is $SF_6$ and the second etchant is $CF_4$, a preferred molar ratio of first etchant to second etchant includes, but is not limited to, ratios in the range of 0.05:1 to 0.15:1 or in the range of 0.05:1 to 0.2:1. Increasing the molar ratio of first etchant to second etchant typically decreases the ratio of the mask etch rate to the light transmitting medium etch rate.

A suitable etch for applying the etching medium includes, but is not limited to, an inductively coupled reactive ion etch (RIE), a capacitively coupled RIE, a magnetically field enhanced RIE (MERIE), a helicon plasma RIE, electron cyclotron resonance (ECR) plasma RIE and other high density plasma etches. When the first etchant is $SF_6$ and the second etchant is $CF_4$, a preferred etch includes, but is not limited to, an inductively coupled plasma RIE.

A chamber pressure for application of the etchant includes, but is not limited to, pressures greater than 0.1 mT, 0.5 mT, 1 mT, 2 mT or 3 mT, 3.5 mT and/or pressures less than 500 mT, 200 mT, 100 mT, 50 mT, 20 mT, or 5 mT. The pressure can be a function of the etcher type. For instance, a capacitively coupled RIE etcher can employ higher pressures than an inductively coupled plasma RIE etcher. When the etching medium is applied in a directional etch, lower pressures can increase the degree of smoothness achieved by the etch because the lower pressure allows for a higher degree of directionality. Suitable chamber, or cathode, temperatures during application of the etching medium include, but are not limited to, 10° C. to 50° C.

When an inductively coupled plasma RIE etch is employed, a suitable RF power (also called RF bias power) is greater than 80 W, 100 W or 115 W and/or less than 160 W, 140 W or 125W at about 400 kHz frequency. In some instances, the RF power is about 120 W at 400 kHz. When the etchant includes $SF_6$ as a first etchant and a second etchant having the formula $C_xH_yF_z$, the RF power can generally be increased to decrease the medium etch rate relative to the mask etch rate. Accordingly, the RF power can be adjusted to achieve the desired selectivity. In some instances, a different frequency is employed. A common frequency is 13.56 MHz. As frequency increases the power can be increased to provide the same degree of selectivity. For instance, the power employed with a frequency of 13.56 MHz can be 1.5–2 times higher than the power employed with a frequency of 400 kHz.

Other components can be optionally added to the etching medium to improve the performance of the etching medium. In some instances, the etching medium includes oxygen. The oxygen can acts as a passivant that serves to form a protective layer on the optical component during the etch. When the light transmitting medium is silicon and the etching medium includes oxygen, examples of the molar ratio of the first etchant gas to oxygen include, but are not limited to, ratios in the range of 0.1 to 10 or 0.2 to 5. The presence of oxygen in the etching medium can cause accelerated etching of a mask such as a photoresist. The rate at which the photoresist is etched increases as the amount of oxygen increases. The mask etch rate can become very fast at high oxygen concentrations.

An example of other components that can be added to the etching medium include $Si_2$-$F_6$ and/or $SiF_4$. When an oxide mask is employed during application of the etching medium, the $SiF_4$ can increase the selectivity of the etching medium for the light transmitting medium over the mask. More specifically, the Si from the $SiF_4$ can reacts with the Oxygen to form $SiO_2$ on the oxide mask.

Another component that can be added to the etching medium is a noble gas such as Ar, He and Xe. The noble gas can serve to enhance ion bombardment and improve etch uniformity across the wafer.

EXAMPLE 1

The following example is performed on a Decoupled Plasma Source Deep Trench etcher (DPSDT) manufactured by Applied Materials. An optical component precursor is positioned in the chamber. The optical component includes silicon as the light transmitting medium. One or more portions of the optical component are masked with a photoresist having a region with a vertical taper. The optical component precursor is etched by delivering an etching medium having $SF_6$ as the first etchant and $CF_4$ as the second etchant. The $SF_6$ flow rate is about 6 sccm and the $CF_4$ flow rate is about 60 seem so as to maintain the chamber pressure at about 4 mTorr. The source power is operated at 700 W and 13.56 MHz. The cathode is operated at 120 W and 400 KHz and at a temperature of about 10° C. The etch is performed for a period of time needed to etch through at least the portion of the mask having the taper. Accordingly, at least a portion of the vertical taper is transferred to the optical component precursor. The selectivity of Si to resist is 1:1.

EXAMPLE 2

The following example is performed on a Decoupled Plasma Source Deep Trench etcher (DPSDT) manufactured by Applied Materials. An optical component precursor is positioned in the chamber. The optical component includes single crystal Si in some area and poly Si in other areas as the light transmitting medium. The surface of poly Si is rough and the interface of single crystal Si and poly Si have a roughness on the order of 1 um. A photoresist is spin coated on the surface having the smoothness of about 10 nm. The optical component precursor is etched by delivering an etching medium having $SF_6$ as the first etchant and $CF_4$ as the second etchant. The $SF_6$ flow rate is about 6 sccm and the $CF_4$ flow rate is about 60 sccm so as to maintain the chamber pressure at about 4 mTorr. The Source RF power is operated at 700 W and 13.56 MHz. The cathode is operated at 120 W and 400 KHz and at a temperature of about 110° C. The etch is performed for a period of time needed to etch through the rough surface. The remaining Si surface has a roughness in the order of 20 nm.

EXAMPLE 3

The following example is performed on a Decoupled Plasma Source Deep Trench etcher (DPSDT) manufactured by Applied Materials. An optical component precursor is positioned in the chamber. An alternative gas combination and ratio can be used to etch waveguide with the selectivity of Si to resist as desired ratio. The optical component includes silicon as the light transmitting medium. The optical component precursor is etched by delivering an etching medium having $SF_6$ as the first etchant and $CF_4$ as the second etchant. The $SF_6$ flow rate is about 20 sccm and the CHF3 flow rate is about 60 sccm so as to maintain the chamber pressure at about 4 mTorr. The Source RF power is operated at 1000 W and 13.56 MHz. The cathode is operated at 30 W and 400 KHz and at a temperature of about 101C. The etch is performed for a period of time needed to etch to get the desired WG depth. The selectivity of Si to resist is 2:1.

The methods of FIG. 4A through FIG. 6O each employ one or more etches that do not require a precise degree of selectivity. These etches can employ the same etchant and/or etchant delivery conditions as the etches described above. Alternatively, the etchant and/or etchant delivery conditions employed in these etches can be different from the etches disclosed above. During these etches, the integrity of a mask on the component precursor generally remains intact on the component precursor. More specifically, a mask on the component precursor is not etched through. As a result, suitable etches may have a higher selectivity for silicon than for the mask in order to preserve the integrity of the mask during the etch. Suitable etches are described in U.S. patent application Ser. No. 09/845,093, filed on Apr. 27, 2001, entitled "Formation of an Optical Component" U.S. patent application Ser. No. 10/072,811, filed on Feb. 8, 2002, entitled "Formation of an Optical Component Having Smooth Sidewalls" and incorporated herein in its entirety.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of fabricating an optical component, comprising:
   forming a mask on an optical component precursor having a ridge with a horizontally tapered region, the mask including a vertical taper positioned over the horizontally tapered region of the ridge;
   etching through at least a portion of the mask so as to etch the ridge concurrently with remaining mask and transfer the vertical taper to the underlying ridge, a ratio of the ridge etch rate to the mask etch rate being less than 1.5:1.

2. The method of claim 1, wherein the ratio is between 0.8:1 and 1.2:1.

3. The method of claim 1, wherein the ratio is between 0.9:1 and 1.1:1.

4. The method of claim 1, wherein the mask is positioned over a rough surface on the ridge and a surface of the mask positioned over the rough surface is smoother than the rough surface.

5. The method of claim 4, wherein etching through at least a portion of the mask includes etching through at least a portion of the mask positioned over the rough surface so as to smooth the rough surface.

6. The method of claim 1, wherein etching through at least a portion of the mask includes employing an etchant including a Fluorine containing gas.

7. The method of claim 1, wherein etching through at least a portion of the mask includes employing an etchant including a Fluorine containing gas and a second component having the formula $C_xH_yF_z$ where X=1 or greater, Y=0 or greater, and Z=1 or greater, the second component being different from the Fluorine containing gas.

8. The method of claim 7, wherein a molar ratio of Fluorine containing gas to second component in the etchant is in the range of 0.005:1 to 0.25:1.

9. The method of claim 1, wherein etching through at least a portion of the mask includes employing an etchant including a Fluorine containing gas and a component selected from the group consisting of $CF_4$, $CHF_3$, $CH_2F_2$, $C_2F_6$, $C_4F_6$, and $C_4F_8$.

10. The method of claim 1, wherein etching the optical component precursor includes employing an etchant including $SF_6$ and $CF_4$.

11. The method of claim 1, wherein etching the optical component precursor includes employing an etchant including $CF_4$.

12. The method of claim 1, wherein etching the optical component precursor includes applying an etchant to the optical component precursor at an RF DC bias power of about 100 W to 140 W.

13. The method of claim 1, wherein etching the optical component precursor includes applying an etchant to the optical component precursor at a pressure in a range of 1–20 mTorr.

14. The method of claim 1, wherein etching the optical component precursor includes applying an etchant to the optical component precursor at a pressure in a range of 1 to 10 mTorr.

15. The method of claim 1, wherein the mask is a photoresist and the ridge is silicon.

16. The method of claim 1, wherein the mask is a photoresist and the ridge is polysilicon.

17. A method of fabricating an optical component, comprising:

forming a mask on an optical component precursor;

etching through at least a portion of the mask so as to etch a medium underlying the mask concurrently with remaining mask and transfer a feature of an upper surface of the mask onto an upper surface of the underlying medium, the etch employing an etchant that includes a Fluorine containing gas and one or more second components having the general formula $C_xH_yF_z$ where X=1 or greater, Y=0 or greater, and Z=1 or greater and applied so as to provide a ratio of medium etch rate to mask etch rate in a range of 0.9:1 to 1.1:1.

18. The method of claim 17, wherein the mask includes a vertical taper and etching through at least a portion of the mask substantially transfers the vertical taper to the underlying medium.

19. The method of claim 18, wherein the underlying medium includes a ridge that tapers horizontally and the vertical taper of the mask is positioned over the horizontally tapered region of the underlying medium and the etch substantially transfers the vertical taper to the underlying ridge.

20. The method of claim 18, wherein the vertical taper of the mask is positioned over a region of an optical component precursor where a mode transformer is to be formed on the optical component precursor.

21. The method of claim 17, wherein the underlying medium includes a rough upper surface and an upper surface of the mask is smoother than the rough surface before the etch.

22. The method of claim 21, wherein etching through at least a portion of the mask includes etching through at least a portion of the mask positioned over the rough upper surface so as to smooth the rough upper surface.

23. The method of claim 17, wherein the Fluorine containing gas includes $SF_6$.

24. The method of claim 17, wherein the component having the formula $C_xH_yF_z$, is selected from the group consisting of $CF_4$, $CHF_3$, $CH_2F_2$, $C_2F_6$, $C_4F_6$, and $C_4F_8$.

25. The method of claim 17, wherein a molar ratio of Fluorine containing gas to second component in the etchant is in the range of 0.005:1 to 0.25:1.

26. The method of claim 17, wherein a molar ratio of Fluorine containing gas to second component in the etchant is in the range of 0.05:1 to 0.15:1.

27. The method of claim 17, wherein the etchant includes $SF_6$ and $CF_4$.

28. The method of claim 17, wherein etching the optical component precursor includes applying an etchant to the optical component precursor at an RF DC bias power of about 80 W to 200 W.

29. The method of claim 17, wherein etching the optical component precursor includes applying an etchant to the optical component precursor at a pressure in a range of 0.1–200 mTorr.

30. The method of claim 17, wherein etching the optical component precursor includes applying an etchant to the optical component precursor at a pressure in a range of 1 to 10 mTorr.

31. A method of smoothing a surface on an optical component, comprising:

forming a mask on an optical component such that an upper surface of the mask is smoother than an upper surface of a medium underlying the mask; and etching through at least a portion of the mask so as to concurrently etch underlying medium and remaining mask, the etch being selected such that a ratio of the medium etch rate to the mask etch rate being in a range of 0.9:1 to 1.1:1.

32. The method of claim 31, wherein the mask is a photoresist and the underlying medium is silicon.

* * * * *